US006800956B2

(12) United States Patent
Bartlett

(10) Patent No.: US 6,800,956 B2
(45) Date of Patent: Oct. 5, 2004

(54) WIND POWER SYSTEM

(75) Inventor: Lexington P. Bartlett, Prescott Valley, AZ (US)

(73) Assignee: Lexington Bartlett, Prescott Valley, AZ (US)

( * ) Notice: Subject to any disclaimer, the term of this patent is extended or adjusted under 35 U.S.C. 154(b) by 29 days.

(21) Appl. No.: 10/354,544

(22) Filed: Jan. 29, 2003

(65) Prior Publication Data

US 2003/0141721 A1 Jul. 31, 2003

Related U.S. Application Data

(60) Provisional application No. 60/352,825, filed on Jan. 30, 2002.

(51) Int. Cl.[7] .................................................. F03D 1/00

(52) U.S. Cl. ............................. 290/55; 290/44; 416/223

(58) Field of Search .............................. 290/43, 44, 54, 290/55; 416/223, 224

(56) References Cited

U.S. PATENT DOCUMENTS

| | | | | | |
|---|---|---|---|---|---|
| 4,273,601 | A | * | 6/1981 | Weingart | 156/189 |
| 4,288,704 | A | * | 9/1981 | Bosard | 290/55 |
| 4,295,790 | A | * | 10/1981 | Eggert, Jr. | 416/226 |
| 4,408,958 | A | * | 10/1983 | Schacle | 416/237 |
| 4,976,587 | A | * | 12/1990 | Johnston et al. | 416/230 |
| 5,075,564 | A | * | 12/1991 | Hickey | 290/55 |
| 5,289,041 | A | * | 2/1994 | Holley | 290/44 |
| 5,474,425 | A | * | 12/1995 | Lawlor | 416/223 R |
| 5,746,576 | A | * | 5/1998 | Bayly | 416/16 |
| 6,132,181 | A | * | 10/2000 | McCabe | 417/334 |
| 6,327,957 | B1 | * | 12/2001 | Carter, Sr. | 91/41 |

* cited by examiner

Primary Examiner—Nicholas Ponomarenko

(57) ABSTRACT

A system for the generation of electrical power using an improved 600-watt to 900-watt wind turbine system. The system comprises a wind driven generator utilizing an array of uni-directional carbon fiber turbine blades, an air-ducting nose cone, and a supporting tower structure. Additionally, a method of blade fabrication utilizing expanding foam, to achieve improved blade edge strength, is disclosed. The support tower utilizes a compressive coupler that permits standard fence pipe to be joined without welding or drilling.

4 Claims, 18 Drawing Sheets

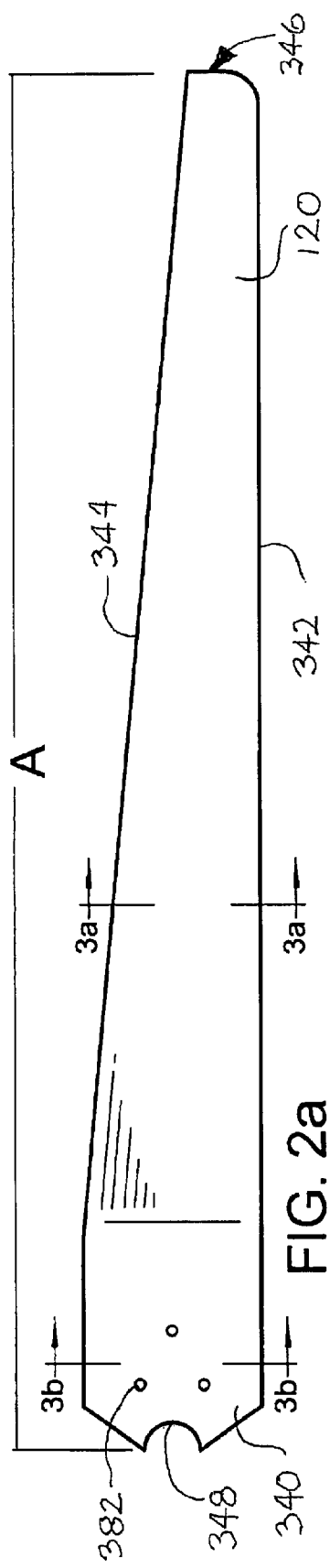
FIG. 2a
FIG. 2b
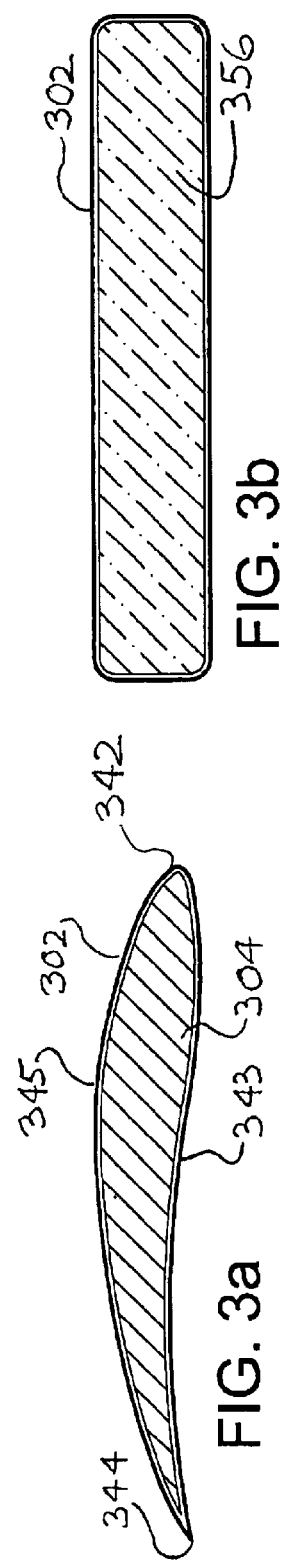
FIG. 3b
FIG. 3a

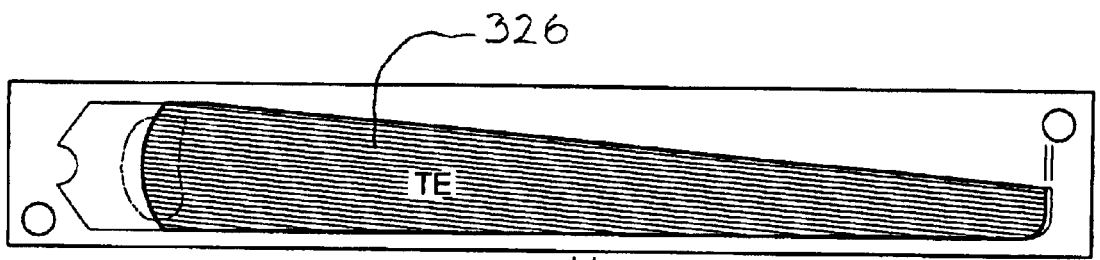
FIG. 9f
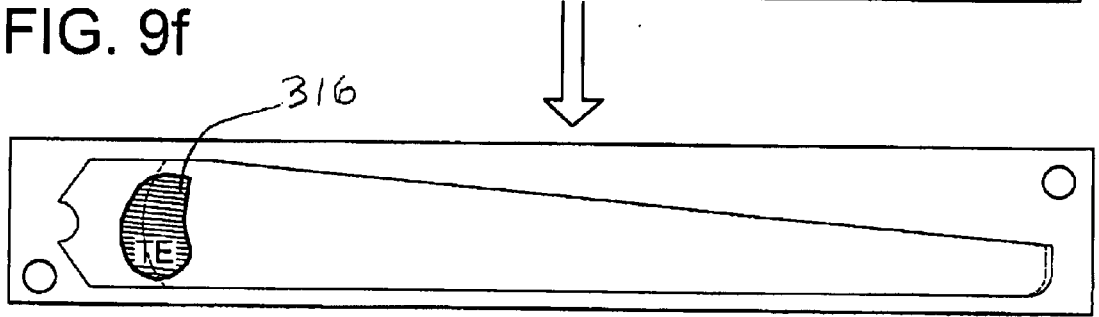
FIG. 9g
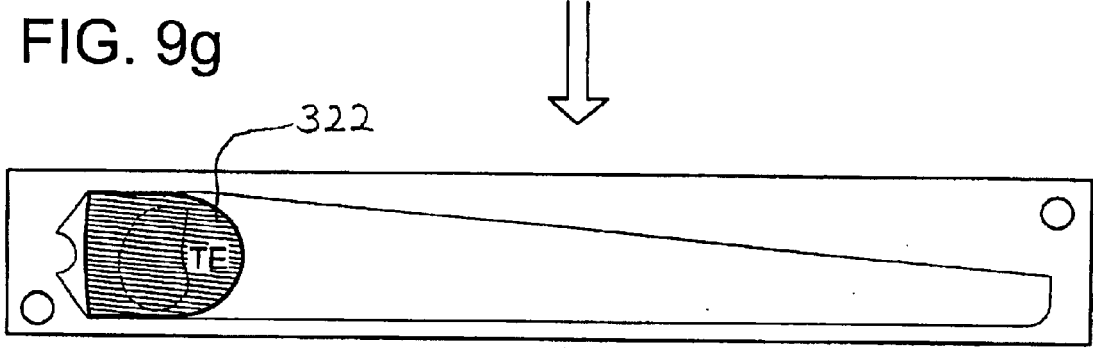
FIG. 9h
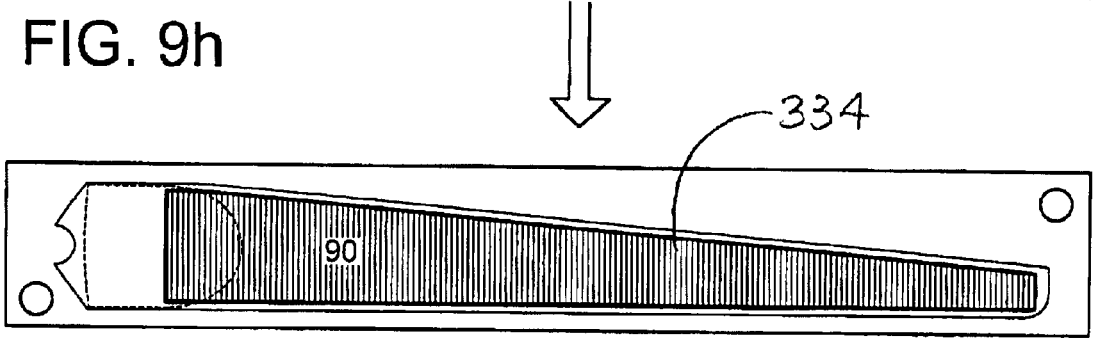
FIG. 9j
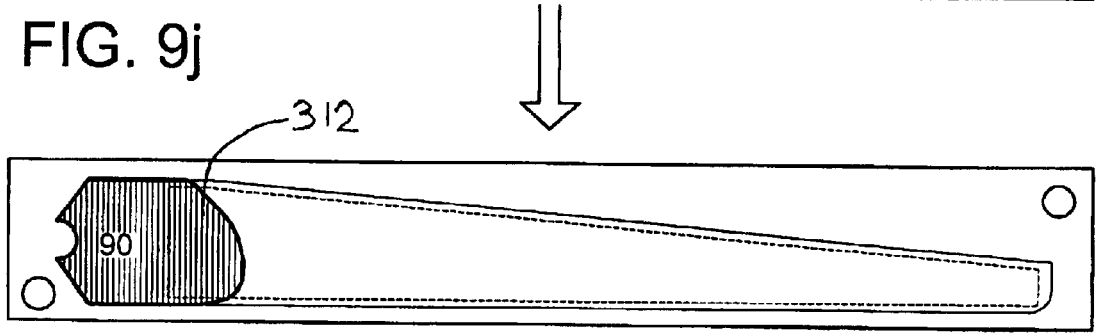
FIG. 9k

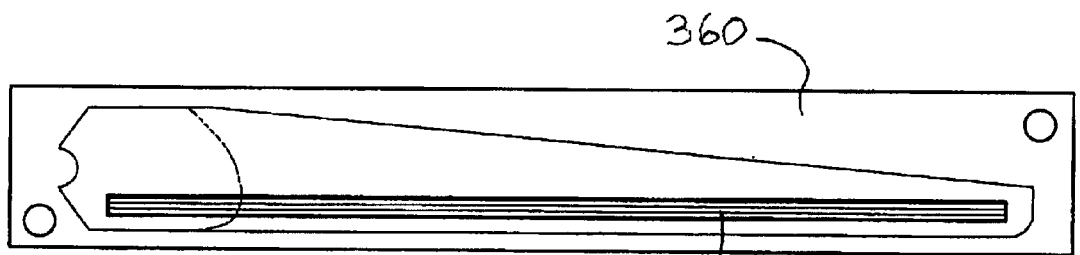
FIG. 9l
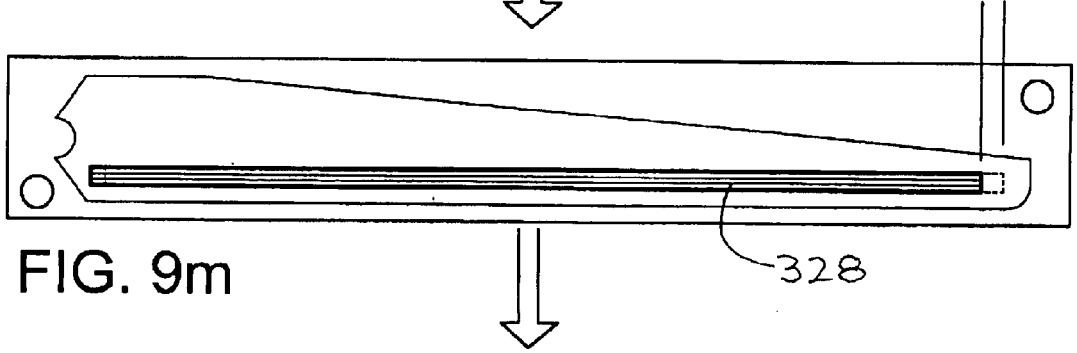
FIG. 9m
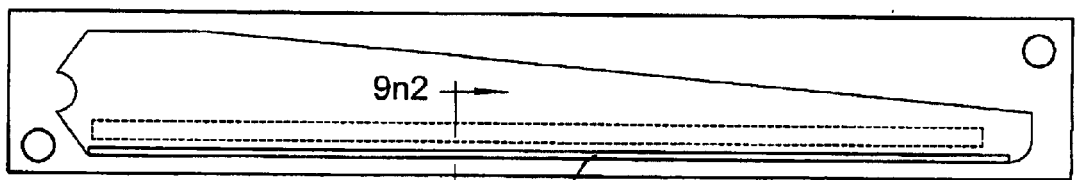
FIG. 9n
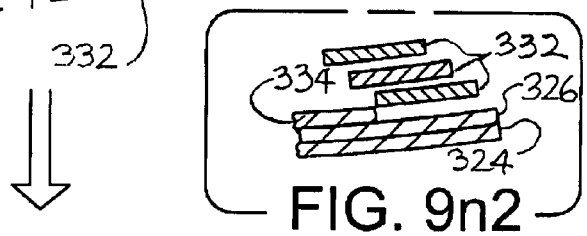
FIG. 9n2
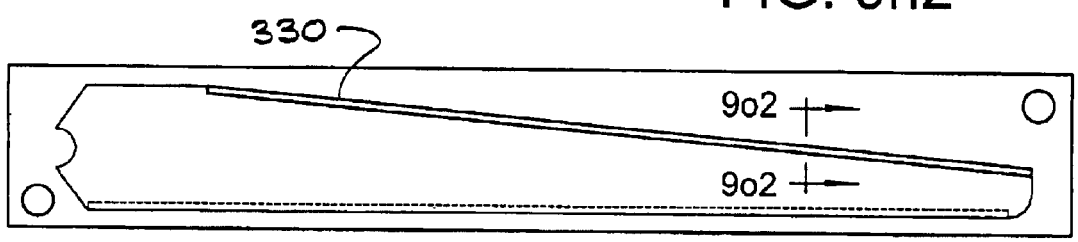
FIG. 9o
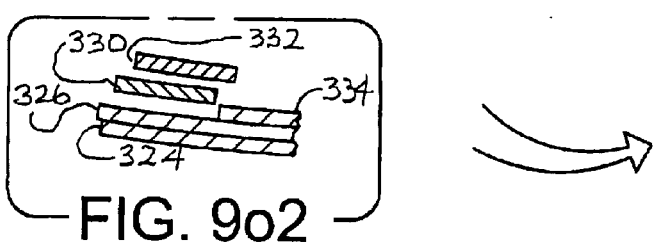
FIG. 9o2

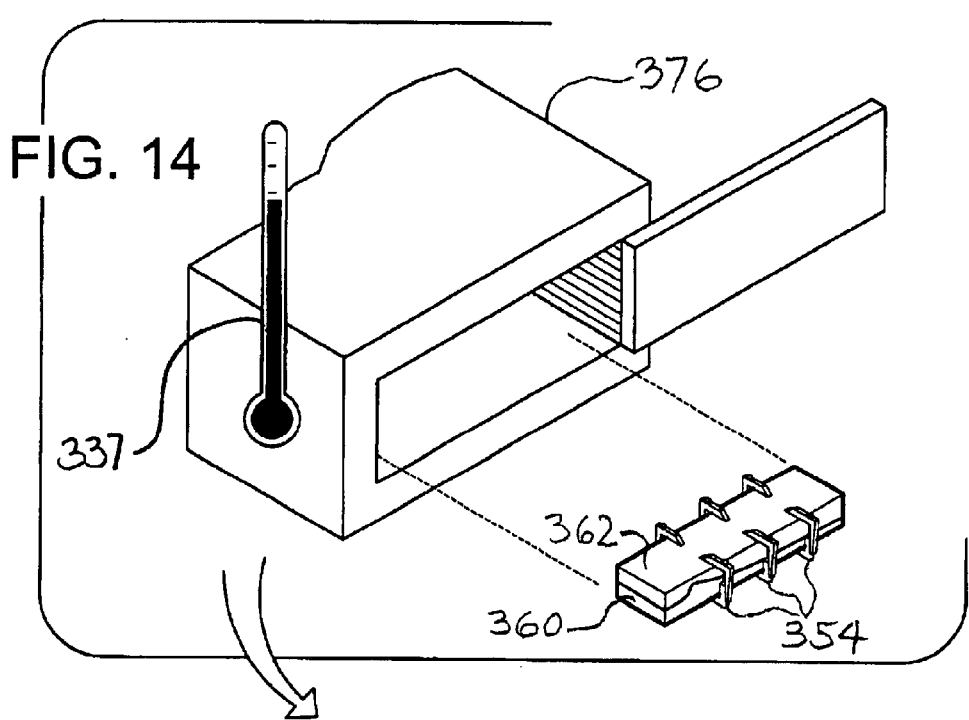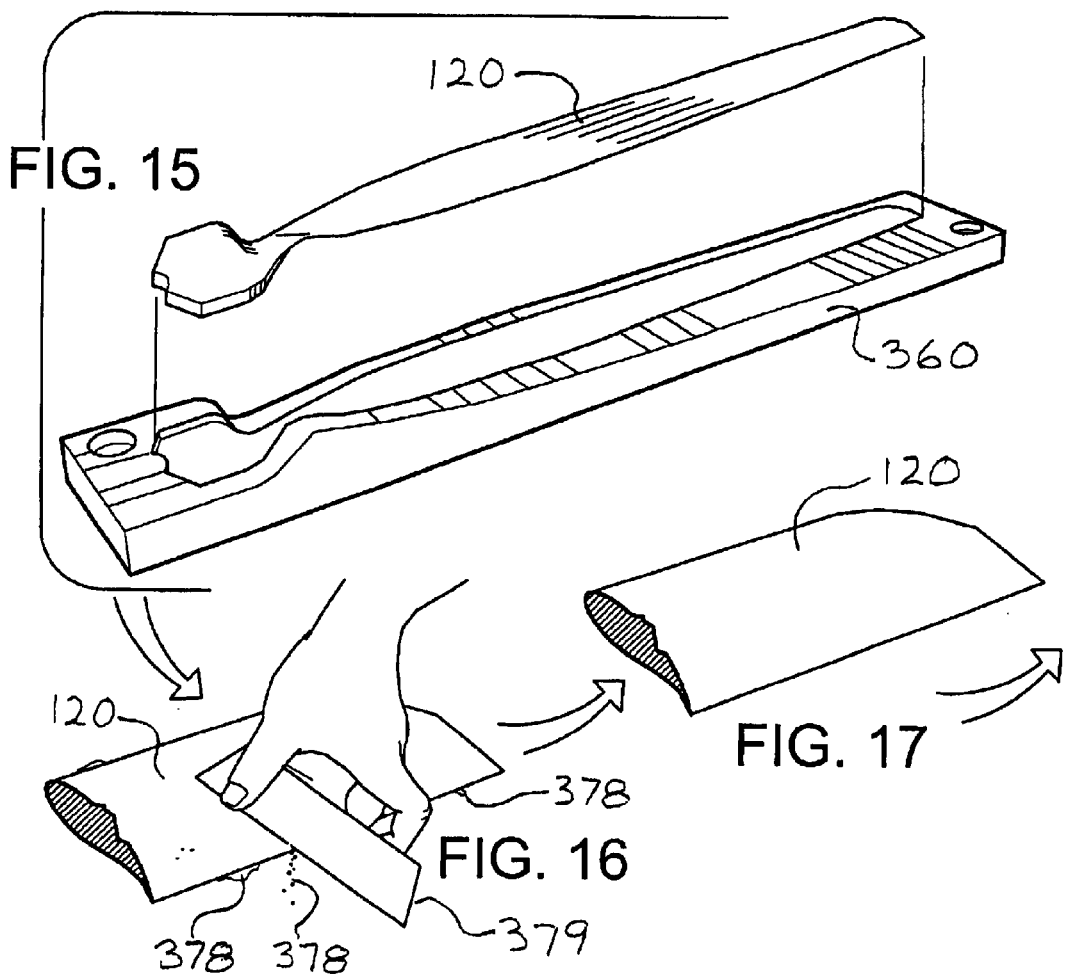

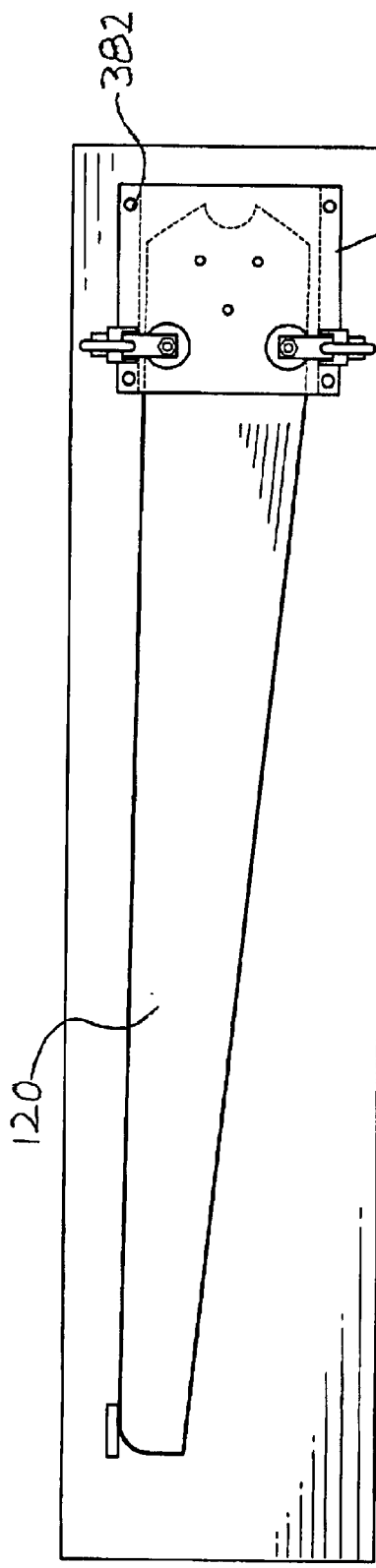
FIG. 18
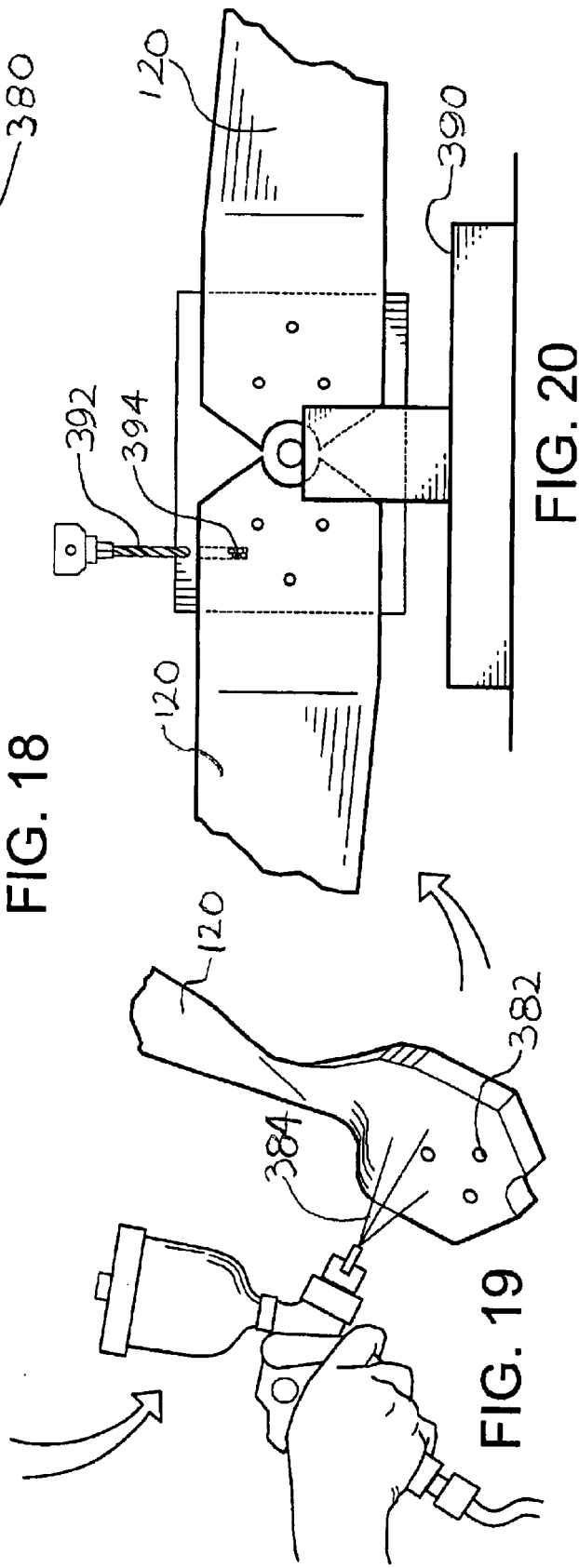
FIG. 20
FIG. 19

WIND POWER SYSTEM

CROSS-REFERENCE TO RELATED APPLICATION

The present application is related to applicant's prior U.S. Provisional Application No. 60/352,825, filed Jan. 30, 2002, entitled "WIND POWER SYSTEM", the contents of which are herein incorporated by reference and are not admitted to be prior art with respect to the present invention by their mention in this cross-reference section.

BACKGROUND

This invention relates to providing a system for the generation of electrical power using an improved 900-watt class wind turbine system. For centuries, man has harnessed the almost unlimited power of the wind. Today, wind-driven systems to generate electrical power range in size from large multi-megawatt utility class units to small battery charging systems used at remote monitoring stations.

One class of wind turbines having a great potential for increased utilization falls in about the 600 to 900 watt range. Turbines in this power class are of suitable capacity to generate electrical power for individual residences (and similar applications having small to moderate power requirements).

Typically, the principal limiting factor in the general application of small-scale wind generation is cost. Today, the cost of on-site wind power generation typically exceeds the cost of power derived from the most common traditional power generation sources, i.e., utility-scale power grids. Other limiting factors include undesirable noise generated by traditional turbine blade assemblies. History has shown that the over-reliance on fossil fuels as the primary means of electrical power production is increasingly problematic in a volatile world energy market. It is clear that improvement in the efficiency, cost and reliability of small to medium on-site wind generation systems would benefit many.

Wind turbine blades made of wood or other similarly heavy materials require relatively high initial wind speeds to start up and cannot take advantage of lower wind speeds to generate power. Wind turbine blades made of plastic or other similarly light materials often are not stiff enough to prevent significant loss of efficiency when the shape of the blade is deformed by the wind. Additionally, turbine blades that are not stiff enough can produce vibrations that can result in increased maintenance costs and undesirable noise. Wind turbine blades reinforced with carbon fiber can be made stronger and lighter than traditional materials but are expensive to produce, given the cost of materials and current manufacturing methods. In such wind turbine systems of such intermediate size (i.e., about 600 to 900 watts), every gram of weight and inertial mass which can be saved by improved blade technology tends to result in less costly turbines and supporting structures to achieve reliability.

In the past, the tower support structures, which elevate the turbine above the ground, have been relatively difficult to assemble/erect. In the past, towers have been assembled by connecting segments of pipe together with threaded fittings, which are difficult to align correctly, given the typical long, unwieldy segments of pipe. Also, the threads can become stripped in the assembly process, causing further difficulties. Also, some towers have failed (for example, by being blown over) in high winds when the lateral supports (guy wires) have become detached at the connection to the tower mast. In the past, guy wire connections to the tower mast have been provided by welding loops of rebar or similar pieces of metal to fittings, and threading the guy wire through the loops. In the past, these connections have failed at the welds.

In use, wind turbine generators build up heat, which must be dissipated to ensure the proper, efficient and reliable continued functioning of the generator. In the past, generators have been cooled by various means, including both active measures, such as powered fans, and passive measures, such as heat radiating vanes. The disadvantage of active cooling measures is that they tend to be expensive; whereas, the disadvantage of passive measures is that they tend to be less effective in dissipating heat quickly.

OBJECTS OF THE INVENTION

A primary object and feature of the present invention is to provide a system for the production of electricity using power derived from the wind.

It is a further object and feature of the present invention to provide such a system that has a lower cost to produce and operate than other alternate power generation systems. It is a further object and feature of the present invention to provide such a system that has high power generation efficiency.

It is a further object and feature of the present invention to provide such a system that produces a low level of sound during operation.

It is a further object and feature of the present invention to provide such a system that is relatively easy to install and maintain.

It is a further object and feature of the present invention to provide such a system that can operate in low wind speed conditions.

It is a further object and feature of the present invention to provide such a system that resists failure in high winds.

It is a further object and feature of the present invention to provide such a system that allows relatively versatile and simple erection and installation.

It is a further object and feature of the present invention to provide such a system that efficiently cools the generator.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a wind-driven system, for producing electric current, comprising, in combination: at least one frame adapted to swivel about a substantially vertical axis, comprising at least one front-portion adapted to extend forwardly into a wind-flow direction and at least one rear-portion adapted to extend rearwardly downwind from such at least one front portion; at least one guide-vane connected to such at least one frame and adapted to guide such at least one frame with respect to the wind-flow direction; at least one magnetic-field producer, comprising at least one rotor adapted to rotate about at least one rotational axis; at least one alternator, connected to such at least one frame, adapted to produce electric current, comprising at least one rotor shaft adapted to support such rotor for rotation of such at least one magnetic-field producer; wherein such at least one magnetic-field producer and such at least one alternator together comprise at least one electric current generator; and at least one airfoil blade, mounted to at least one end of such at least one rotor, adapted to drive such at least one rotor; and at least one nose-cone, extending forwardly from such at least one front-portion, adapted to modify air-flow through such wind-driven means; wherein such at least one nose-cone comprises at least one peripheral relief adapted to permit augmentation of air flow in cooling relationship with such at least one electric current generator.

Moreover, it provides such a system wherein: such at least one airfoil blade comprises at least one longitudinal axis and at least one skin and at least one interior; such at least one skin substantially comprises axial reinforcers adapted to reinforce such at least one skin substantially unidirectionally substantially parallel to the at least one longitudinal axis; and such at least one interior comprises at least one foam element comprising at least one material associated with enabling substantial outward pressure on such at least one skin during curing of such at least one foam element. Additionally, it provides such a system wherein: such at least one airfoil blade comprises at least one longitudinal axis and at least one skin and at least one outward interior and at least one inward interior; wherein such at least one skin substantially comprises axial reinforcers adapted to reinforce such at least one skin substantially unidirectionally substantially parallel to the at least one longitudinal axis; and wherein such at least one inward interior comprises vermiculite.

Also, it provides such a system, further comprising: at least one supporting tower for such at least one frame; wherein such at least one supporting tower comprises at least one first length of support pipe at least one second length of support pipe at least one guy wire for ground attachment for lateral support for such at least one tower, and at least one connector adapted both to firmly connect an upper end of such at least one first length of support pipe to a lower end of such at least one second length of support pipe, and firmly connect such at least one guy wire to such at least one connector. In addition, it provides such a system wherein: such at least one airfoil blade comprises at least one longitudinal axis and at least one skin and at least one interior; and wherein such at least one skin substantially comprises multiple layers of axial reinforcers adapted to reinforce such at least one skin substantially unidirectionally substantially parallel to the at least one longitudinal axis, and one layer of transverse reinforcers adapted to reinforce such at least one skin substantially unidirectionally substantially perpendicular to the at least one longitudinal axis.

In accordance with another preferred embodiment hereof, this invention provides a wind-driven system, for producing electric current, comprising, in combination: at least one frame adapted to swivel about a substantially vertical axis, comprising at least one front-portion adapted to extend forwardly into a wind-flow direction and at least one rear-portion adapted to extend rearwardly downwind from such at least one front portion; at least one guide-vane connected to such at least one frame and adapted to guide such at least one frame with respect to the wind-flow direction; at least one magnetic-field producer, comprising at least one rotor adapted to rotate about at least one rotational axis; at least one alternator, connected to such at least one frame, adapted to produce electric current, comprising at least one rotor shaft adapted to support such rotor for rotation of such at least one magnetic-field producer; wherein such at least one magnetic-field producer and such at least one alternator together comprise at least one electric current generator; and at least one airfoil blade, mounted to at least one end of such at least one rotor, adapted to drive such at least one rotor; and at least one nose-cone, extending forwardly from such at least one front-portion, adapted to modify air-flow through such wind-driven means; wherein such at least one airfoil blade comprises at least one longitudinal axis and at least one skin and at least one interior; wherein such at least one skin substantially comprises axial reinforcers adapted to reinforce such at least one skin substantially unidirectionally substantially parallel to the at least one longitudinal axis; wherein such at least one interior comprises at least one foam element comprising at least one material associated with enabling substantial outward pressure on such at least one skin during curing of such at least one foam element.

And, it provides such a system wherein: such at least one airfoil blade comprises at least one longitudinal axis and at least one skin; such at least one interior comprises at least one outward interior and at least one inward interior; and such at least one inward interior comprises vermiculite. Further, it provides such a system, further comprising: at least one supporting tower for such at least one frame; wherein such at least one supporting tower comprises at least one first length of support pipe at least one second length of support pipe at least one guy wire for ground attachment for lateral support for such at least one tower, and at least one connector adapted both to firmly connect an upper end of such at least one first length of support pipe to a lower end of such at least one second length of support pipe, and firmly connect such at least one guy wire to such at least one connector. Even further, it provides such a system wherein such at least one skin substantially comprises multiple layers of axial reinforcers adapted to reinforce such at least one skin substantially unidirectionally substantially parallel to the at least one longitudinal axis, and one layer of transverse reinforcers adapted to reinforce such at least one skin substantially unidirectionally substantially perpendicular to the at least one longitudinal axis.

In accordance with another preferred embodiment hereof, this invention provides a wind-driven system, for producing electric current, comprising, in combination: at least one frame adapted to swivel about a substantially vertical axis, comprising at least one front-portion adapted to extend forwardly into a wind-flow direction and at least one rear-portion adapted to extend rearwardly downwind from such at least one front portion; at least one guide-vane connected to such at least one frame and adapted to guide such at least one frame with respect to the wind-flow direction; at least one magnetic-field producer, comprising at least one rotor adapted to rotate about at least one rotational axis; at least one alternator, connected to such at least one frame, adapted to produce electric current, comprising at least one rotor shaft adapted to support such rotor for rotation of such at least one magnetic-field producer; wherein such at least one magnetic-field producer and such at least one alternator together comprise at least one electric current generator; and at least one airfoil blade, mounted to at least one end of such at least one rotor, adapted to drive such at least one rotor; at least one nose-cone, extending forwardly from such at least one front-portion, adapted to modify air-flow through such wind-driven means; wherein such at least one airfoil blade comprises at least one longitudinal axis and at least one skin and at least one outward interior and at least one inward interior; wherein such at least one skin substantially comprises axial reinforcers adapted to reinforce such at least one skin substantially unidirectionally substantially parallel to the at least one longitudinal axis; wherein such at least one inward interior comprises vermiculite.

Moreover, it provides such a system wherein such at least one outward interior comprises at least one foam element comprising at least one material associated with enabling substantial outward pressure on such at least one skin during curing of such at least one foam element. Additionally, it provides such a system further comprising: at least one supporting tower for such at least one frame; wherein such at least one supporting tower comprises at least one first length of support pipe at least one second length of support pipe at least one guy wire for ground attachment for lateral support for such at least one tower, and at least one connector adapted both to firmly connect an upper end of such at least one first length of support pipe to a lower end of such at least one second length of support pipe, and firmly connect such at least one guy wire to such at least one connector. Also, it provides such a system wherein such at least one skin substantially comprises multiple layers of axial reinforcers adapted to reinforce such at least one skin substantially unidirectionally substantially parallel to the at least one longitudinal axis, and one layer of transverse reinforcers adapted to reinforce such at least one skin substantially unidirectionally substantially perpendicular to the at least one longitudinal axis.

In accordance with another preferred embodiment hereof, this invention provides a wind-driven system, for producing electric current, comprising, in combination: at least one frame adapted to swivel about a substantially vertical axis, comprising at least one front-portion adapted to extend forwardly into a wind-flow direction and at least one rear-portion adapted to extend rearwardly downwind from such at least one front portion; at least one guide-vane connected to such at least one frame and adapted to guide such at least one frame with respect to the wind-flow direction; at least one magnetic-field producer, comprising at least one rotor adapted to rotate about at least one rotational axis; at least one alternator, connected to such at least one frame, adapted to produce electric current, comprising at least one rotor shaft adapted to support such rotor for rotation of such at least one magnetic-field producer; wherein such at least one magnetic-field producer and such at least one alternator together comprise at least one electric current generator; and at least one airfoil blade, mounted to at least one end of such at least one rotor, adapted to drive such at least one rotor; at least one nose-cone, extending forwardly from such at least one front-portion, adapted to modify air-flow through such wind-driven means; at least one supporting tower for such at least one frame; wherein such at least one supporting tower comprises at least one first length of support pipe at least one second length of support pipe at least one guy wire for ground attachment for lateral support for such at least one tower, and at least one connector adapted both to firmly connect an upper end of such at least one first length of support pipe to a lower end of such at least one second length of support pipe, and firmly connect such at least one guy wire to such at least one connector. In addition, it provides such a system wherein: such at least one airfoil blade comprises at least one longitudinal axis and at least one skin and at least one interior; and wherein such at least one skin substantially comprises multiple layers of axial reinforcers adapted to reinforce such at least one skin substantially unidirectionally substantially parallel to the at least one longitudinal axis, and one layer of transverse reinforcers adapted to reinforce such at least one skin substantially unidirectionally substantially perpendicular to the at least one longitudinal axis.

And, it provides such a system wherein: such at least one nose-cone comprises at least one peripheral relief adapted to permit augmentation of air flow in cooling relationship with such at least one electric current generator; such at least one airfoil blade comprises at least one longitudinal axis and at least one skin and at least one interior; such at least one skin substantially comprises axial reinforcers adapted to reinforce such at least one skin substantially unidirectionally substantially parallel to the at least one longitudinal axis; and such at least one interior comprises at least one foam element comprising at least one material associated with enabling substantial outward pressure on such at least one skin during curing of such at least one foam element.

In accordance with another preferred embodiment hereof, this invention provides a wind-driven system, for producing electric current, comprising, in combination: at least one frame adapted to swivel about a substantially vertical axis, comprising at least one front-portion adapted to extend forwardly into a wind-flow direction and at least one rear-portion adapted to extend rearwardly downwind from such at least one front portion; at least one guide-vane connected to such at least one frame and adapted to guide such at least one frame with respect to the wind-flow direction; at least one magnetic-field producer, comprising at least one rotor adapted to rotate about at least one rotational axis; at least one alternator, connected to such at least one frame, adapted to produce electric current, comprising at least one rotor shaft adapted to support such rotor for rotation of such at least one magnetic-field producer; wherein such at least one magnetic-field producer and such at least one alternator together comprise at least one electric current generator; and at least one airfoil blade, mounted to at least one end of such at least one rotor, adapted to drive such at least one rotor; and at least one nose-cone, extending forwardly from such at least one front-portion, adapted to modify air-flow through such wind-driven means; wherein such at least one airfoil blade comprises at least one longitudinal axis and at least one skin and at least one interior; wherein such at least one skin substantially comprises multiple layers of axial reinforcers adapted to reinforce such at least one skin substantially unidirectionally substantially parallel to the at least one longitudinal axis, and one layer of transverse reinforcers adapted to reinforce such at least one skin substantially unidirectionally substantially perpendicular to the at least one longitudinal axis.

In accordance with another preferred embodiment hereof, this invention provides a coupling system, for connecting at least one first elongated member to at least one second elongated member and assisting connection to at least one lateral support of at least one tower support system, comprising, in combination: at least one first compression attachment adapted to compression-attach such coupling system to the at least one first elongated member of the at least one tower support system, wherein such at least one first compression attachment comprises, at least one first adjuster for adjusting at least one compressive force of such at least one first compression attachment, at least one first force distributer adapted to distribute at least one compressive force substantially evenly around at least one perimeter of the at least one first elongated member; and at least one second compression attachment adapted to compression-attach such coupling system to the at least one second elongated member of the at least one tower support system, wherein such at least one second compression attachment comprises, at least one second adjuster for adjusting at least one compressive force of such at least one second compression attachment, at least one second force distributer adapted to distribute at least one compressive force substantially evenly around at least one perimeter of the at least one second elongated member; and at least one attacher adapted to assist firm attachment of such coupling system to the at least one lateral support.

Further, it provides such a coupling system further comprising: at least one first blocker adapted to block a portion of such at least one first elongated member from penetrating completely through the coupling system; and at least one second blocker adapted to block a portion of such at least one second elongated member from penetrating completely through the coupling system. Even further, it provides such a coupling system wherein such coupling system comprises stainless steel. Even further, it provides such a coupling system wherein such at least one attacher essentially consists of a unitary piece of metal.

In accordance with another preferred embodiment hereof, this invention provides an airfoil blade system, having at least one longitudinal axis, comprising, in combination: at least one blade skin and at least one blade interior; wherein such at least one blade skin substantially comprises multiple layers of axial reinforcers adapted to reinforce such at least one blade skin substantially unidirectionally substantially parallel to the at least one longitudinal axis, and one layer of transverse reinforcers adapted to reinforce such at least one skin substantially unidirectionally substantially perpendicular to the at least one longitudinal axis.

In accordance with another preferred embodiment hereof, this invention provides an airfoil blade system, having at least one longitudinal axis, comprising, in combination: at least one blade skin and at least one outward blade interior and at least one inward blade interior; wherein such at least one blade skin substantially comprises axial reinforcers adapted to reinforce such at least one blade skin substantially unidirectionally substantially parallel to the at least one longitudinal axis; and wherein such at least one inward blade interior comprises vermiculite. Even further, it provides such a system wherein such at least one outward blade interior comprises expanded foam.

In accordance with another preferred embodiment hereof, this invention provides an airfoil blade, having at least one longitudinal axis, comprising, in combination: at least one blade skin, comprising at least one face and at least one edge and at least one mold parting line portion; at least one blade interior; wherein at least one first such edge comprises such at least one mold parting line portion; wherein such at least one skin substantially comprises axial reinforcers adapted to reinforce such at least one skin substantially unidirectionally substantially parallel to the at least one longitudinal axis; wherein such at least one interior comprises at least one foam element comprising at least one material associated with enabling substantial outward pressure on such at least one skin during curing of such at least one foam element; and wherein such at least one first edge comprises a greater relative amount of such axial reinforcers than at least one such face adjoining such at least one such face. Even further, it provides such a system wherein such axial reinforcers substantially comprise carbon fibers. Even further, it provides such a system wherein such at least one material comprises residue from expanded foam selected from the class consisting essentially of: foams comprising polyurethane foams comprising polyisocyanurate.

In accordance with a preferred embodiment hereof, this invention also provides a system, for making an airfoil blade, comprising the steps of: providing a blade mold, comprising at least one mold parting line and comprising a plurality of relief apertures adjacent such at least one mold parting line, such relief apertures being adapted to permit excess fluid material to exit from the blade mold, such blade mold comprising at least one appliance portion and at least one blade portion; applying to substantially all interior faces of such blade mold a plurality of reinforcing fiber pre-preg layers; placing at least one appliance in the at least one appliance portion of such blade mold; placing into the blade mold interior expandable, with exothermal properties, foam sufficient to expand enough to press the pre-preg layers against the blade mold interior; closing the blade mold; placing the blade mold within a closed press before foam expansion separates the mold; waiting for a time period sufficient to permit the foam expansion, by way of the relief apertures, to drive off excess fluid material sufficiently to provide for collection of such reinforcing fibers in at least one blade edge adjacent such at least one parting line. Moreover, it provides such a system further comprising the steps of: placing the blade mold into an oven to cure the pre-preg resin. Additionally, it provides such a system further comprising the steps of: adding extra weight to the blade to match the weight of other blades. Also, it provides such a system wherein: the reinforcing fiber pre-preg layers comprise substantially unidirectional carbon fiber. In addition, it provides such a system wherein: the appliance portion comprises vermiculite. And, it provides such a system wherein: at least 70 percent of the substantially unidirectional carbon fibers in the blade portion are oriented substantially parallel to a longitudinal axis of the blade. Further, it provides such a system wherein: substantially all unidirectional carbon fibers in an outermost layer of the blade portion are oriented substantially parallel to a longitudinal axis of the blade.

BRIEF DESCRIPTION OF THE DRAWINGS

FIG. 2a is a front view of a turbine blade according to a preferred embodiment of the present invention.

FIG. 2b is a side view of the turbine blade of FIG. 2a.

FIG. 3a is a sectional view through section 3a—3a of FIG. 2a.

FIG. 3b is a section through the turbine blade of FIG. 2a at location 3b—3b.

FIG. 7b is a perspective view of an appliance being removed from the opened mold of FIG. 7a.

FIG. 14 is a perspective view of the clamped tools being placed in an oven after being removed from the press, according to a preferred embodiment of the present invention.

FIG. 15 is a perspective view of the turbine blade being removed from the tool after it has been removed from the oven and has cooled.

FIG. 16 is a partial perspective view of the turbine blade showing imperfections from the manufacturing process.

FIG. 17 is a partial perspective view of the turbine blade of FIG. 16 after the imperfections have been removed and the surface has been through the finishing process, according to a preferred method of the present invention.

FIG. 18 is a top view of a turbine blade mounted within a drill jig, according to a preferred method of the present invention.

FIG. 19 is a perspective view of a turbine blade being painted, according to a preferred method of the present invention.

FIG. 20 is a front view of two blades being weight balanced, according to a preferred method of the present invention.

Appendix A is a listing of details about some preferred parts according to the present invention, including information such as source, reference, etc.

DETAILED DESCRIPTION OF A PREFERRED EMBODIMENT OF THE INVENTION

Figure 1:
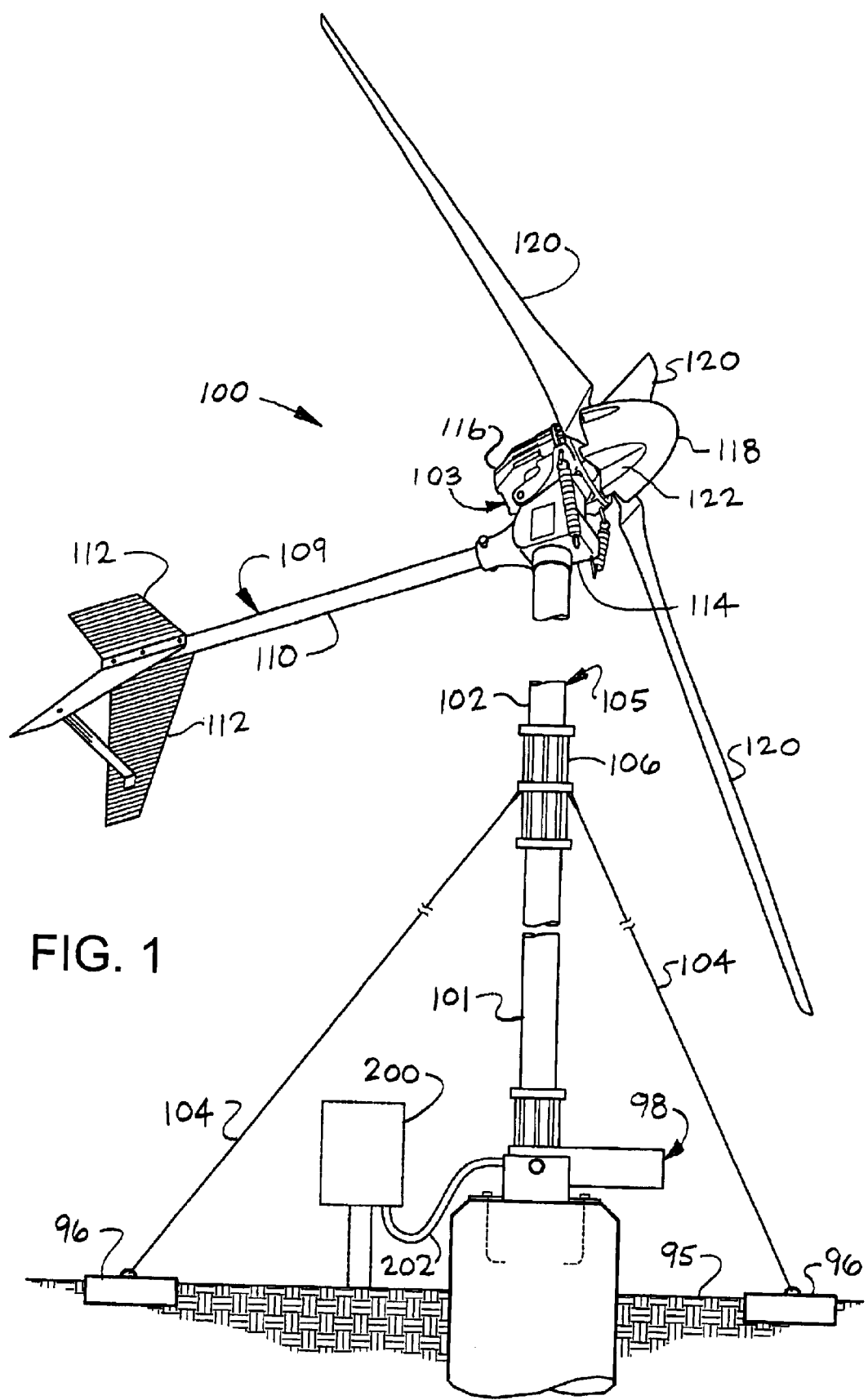
FIG. 1 is a perspective view of a wind power system according to a preferred embodiment of the present invention.

Reference is now made to the drawings. FIG. 1 is a perspective view of a wind power system 100 according to a preferred embodiment of the present invention. An overview of this wind power system 100, various specific elements of which will be further described later in this specification, will illustrate, among other things, the various components which must be structured sufficiently to overcome any excess flutter, weight, lack of stiffness, or high inertial mass of the turbine blades.

Lower pole 101 (herein embodying a first elongated member) is preferably mounted on mast base 98 (also called "base plate), which is preferably fixed in the ground 95, as shown. Compression coupler(s) 106 preferably connect lower pole 101, upper pole 102 (herein embodying a second elongated member), and guy wire(s) 104 (herein embodying at least one lateral support), as shown. To fully form support tower 105, there preferably may be additional intermediary poles between upper pole 102 and lower pole 101, preferably connected with additional compression coupler(s) 106. Preferably, lower pole 101, upper pole 102, and any intermediary poles comprise steel, preferably round steel pipe. It is preferred herein to use fence pipe, of, say, typically, two-inch nominal diameter, to save shipping costs of the illustrated preferred wind power system 100, which may be shipped without the typical several 21-foot-long or 24-foot-long pipe segments (poles) to be used in erecting the tower (since such pipe segments are typically locally available to the user/erecter).

Preferably, guy wire(s) 104 are attached to anchor pad(s) 96, which are preferably fixed in the ground 95, as shown. Guy wire(s) 104 preferably attach to compression coupler(s) 106 to provide lateral support for lower pole 100, upper pole 102 and any intermediary poles that comprise the support tower 105, as shown. Guy wire(s) 104 reinforce the support tower 105 against lateral forces, such as wind. The support tower 105 preferably supports the wind turbine 103, as shown.

Generator housing assembly 114 is preferably rotatably mounted on top of support tower 105 a distance above the ground 95 where the wind regimes are more favorable, with winds being generally more uniform and higher in velocity.

The generator housing assembly 114 preferably pivots on a vertical axis, referred to as the "yaw axis" (going through the longitudinal axis of support tower 105), as shown. Tail fin assembly 109 preferably comprises tail boom 110 and tail fin(s) 112, as shown. Tail fin assembly 109 preferably guides yaw rotation of generator housing assembly 114 so that the wind turbine blade(s) 120 are directed into the wind.

Rotor blade(s) 120 interact with the wind to create lift forces that preferably rotate the rotor and drive the generator 116. The wind turbine blade(s) 120 and nose cone 118 are preferably bolted onto a hub plate (fully shown in a later view). The nose cone 118 preferably comprises apertures or notch(es) 122 (herein embodying a directed-air cooling means) for directing air towards the heat dissipating means of the generator 116 (fully shown in a later view). The hub plate preferably is mounted to the rotor shaft of the generator 116. Generator 116 preferably converts the rotational kinetic energy of the rotor to electricity. Electricity, which is generated by the rotor, is carried down the support tower 105, preferably via electrical wires 202, for connection, for example, to an energy control and storage system 200 (which may include batteries, energy distribution systems, etc.).

It is crucial to the low cost and efficient operation of wind turbine system 100 that the structure and manufacture of airfoil blades 120 be in accordance with all the factors mentioned.

FIG. 2a is a front view of turbine blade 120, with a preferred length A of about 42 inches. LE 342 (Leading Edge) of the blade is the front of the airfoil. TE 344 (Trailing Edge) of the blade is the back of the airfoil. Preferably, blade tip 346 is rounded on the leading edge, as shown, to reduce turbulence. Preferably, mounting end 340 comprises recess 348 that allows turbine blade 120 to closely abut a rotor shaft. Preferably, mounting end 340 comprises mounting holes 382. Preferably, mounting end 340 is substantially planar, as shown, for ease of attachment to a turbine.

FIG. 2b is a side view of turbine blade 120 showing the tendency for the blade tip 346 to undergo deflection 347 from the force of the wind during operation of turbine blade 120. Axial stiffness provided by the carbon fiber outer skin 302 (see FIG. 3a) helps resist the amount of deflection 347.

FIG. 3a is a section through the turbine blade of FIG. 2A at location 3a—3a. Preferably, turbine blade 120 comprises foam core 304 and carbon fiber outer skin 302, as shown. Carbon fiber outer skin 302 provides strength and stiffness for turbine blade 120. The windward side of turbine blade 120 is known as the DZ 343 (Dead Zone) and the leeward side is known as the LZ 345 (Lift Zone).

FIG. 3b is a section through the turbine blade of FIG. 2a at location 3b—3b. Preferably, for extra strength (than the very little provided by foam core 304), mounting end 340 comprises epoxy-resin appliance 356 and carbon fiber outer skin 302, as shown.

Figure 4:
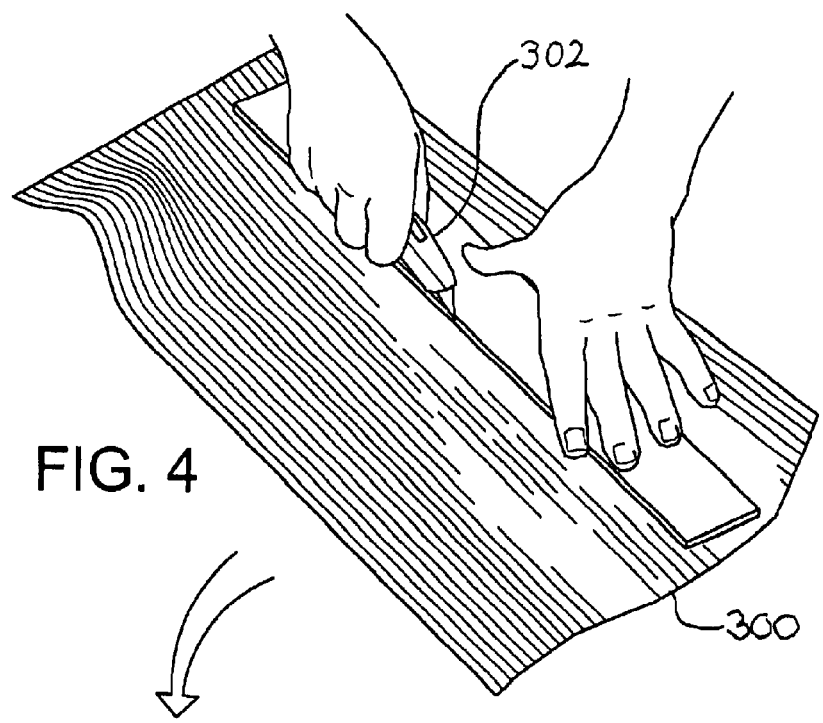
FIG. 4 is a perspective view showing how a sheet of unidirectional pre-preg carbon fiber is cut into pieces used to make the turbine blade, according to a preferred embodiment of the present invention.
Figure 5:
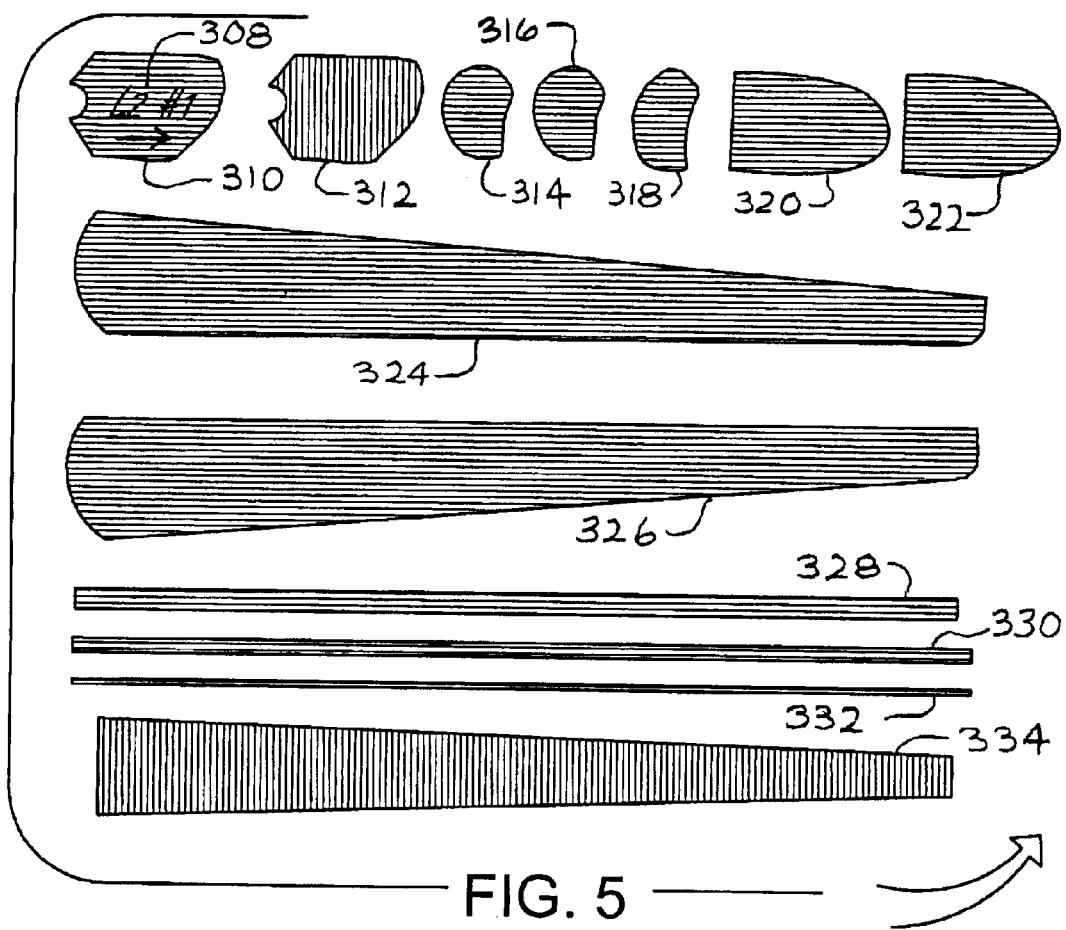
FIG. 5 is a top view of the unidirectional carbon-fiber pieces used to make the turbine blade, according to a preferred embodiment of the present invention.

FIG. 4 is a perspective view showing at least one sheet 300 of pre-preg unidirectional carbon fiber being cut by cutting tool 302 into the pieces used to make the turbine blade, as shown. FIG. 5 is a top view of the unidirectional carbon-fiber pieces 310–334 used to make turbine blade 120, the "unidirection" of the carbon fibers being shown by the direction of shading lines.

Preferably, templates are created so that the different pieces of unidirectional carbon fiber can be cut from the carbon fiber material with consistent shape and size. Preferably, the templates are made of ¼" PVC foam board. Preferably, the shape and size of the templates is determined based on the desired performance requirements of turbine blade 120.

Upon reading this specification, those skilled in the art will now understand that, under appropriate circumstances, considering issues such as material cost, weight, load and stress distributions, etc., other shapes, sizes, and unidirectional fiber orientations, may suffice. For example, when finite-element-analysis of the blade shows that extra reinforcement is required in a particular area of the blade, extra pieces (or different shapes, etc.) of unidirectional carbon fiber may be placed in orientations most efficient to strengthen the area.

Preferably, unidirectional carbon fiber is pre-impregnated with a high temperature cure resin (hereafter also called "pre-preg carbon fiber"). Preferably, the carbon fiber has modulus of 29–35 MSI, preferably about 33 MSI. Preferably, sheet of pre-preg unidirectional carbon fiber 300 is grade USN150A, thickness 0.155, resin content 36%.

Preferably, sheet of pre-preg unidirectional carbon fiber 300 is pre-impregnated with resin at a production facility, rolled on spools, and frozen to prevent the resin from curing prematurely. Pre-preg unidirectional carbon fiber is preferred (over non-pre-preg and woven carbon fiber) for greater strength, lower weight, and greater ease of manufacturing. For example, as compared to the wet-layup carbon fiber process, pre-preg laminate has a precisely controlled resin volume and will typically be 20–30% stiffer and stronger than an equivalent-thickness wet laminate. Woven carbon fiber adds extra weight by having too many fibers aligned in inefficient orientations.

Preferably, the procedure for cutting the pieces is as follows. Preferably, a roll of pre-preg carbon fiber is rolled out on clean flat self-healing surface (for example a table) for cutting. Preferably, the templates are used to estimate the amount of pre-preg carbon fiber material needed for a lay-up. Preferably, the templates are used to cut the pieces from the sheet of pre-preg unidirectional carbon fiber 300.

Preferably, all the necessary pieces for one side of the turbine blade are cut and placed in a kit for refrigerated storage until the pieces are needed. Preferably, two kits are used in manufacturing a turbine blade, one kit for the "dead zone" (DZ) side of the turbine blade, and a different kit for the "lift zone" (LZ) side of the turbine blade. Depending on the symmetry of the turbine blade, the DZ kit and LZ kit may comprise pieces of different sizes and shapes.

"Leading edge" (also "LE") refers to a piece that is cut so that when it is placed in the proper position within the mold the unidirectional fibers will be aligned in parallel with the leading edge of the turbine blade. "Trailing edge" (also "TE") refers to a piece that is cut so that when it is placed in the proper position within the mold the unidirectional fibers will be aligned in parallel with the trailing edge of the turbine blade. Preferably, due to geometry of the blade, the angle between the leading edge and trailing edge is about four to about six degrees. Upon reading this specification, those skilled in the art will now understand that, under appropriate circumstances, considering issues such as type of turbine blade, wind regime, etc., other wind turbine blade geometries, such as with different angles, etc., may suffice. It is noted, for example, that the leading edge and trailing edge of the mounting block portion of the preferred example turbine blade (shown in the drawings) are parallel, making the distinction between LE and TE in this region of the blade moot, for purposes of distinguishing carbon fiber alignment. These ranges of geometry (of this paragraph) are what is meant by phrases such as "unidirectional substantially parallel to the longitudinal axis of the blade". "90-degree" refers to a piece that is cut so that, when it is placed in the proper position within the mold, the unidirectional fibers will be aligned substantially perpendicular to the longitudinal axis of the turbine blade.

90-degree oriented carbon fibers help resist torsional stresses. Preferably, there is a greater percentage of unidirectional fibers aligned in the LE and TE orientations (substantially axially), than in the 90 degree orientation (substantially perpendicular to axial), since axial loads tend to be greater than torsional loads for turbine blades.

"Dead Zone" (also "DZ") refers to the side of the turbine blade that is designed to operate as the windward side. "Lift Zone" (also "LZ") refers to the side of the turbine blade that is designed to operate as the leeward side. Preferably, there is a DZ tool (for the DZ side) and an LZ tool (for the LZ side), which fit together to form a mold of the turbine blade, as shown. Preferably, the DZ tool and LZ tool are each made of carbon-fiber-for dimensional stability, light weight (for ease of manipulation in manufacturing process), and rapid cooling.

Preferably, for example, an LZ kit according to a preferred embodiment of the present invention comprises the following pieces:

- Two—LZ LE main body piece 324
- One—LZ TE main body piece 326
- Two—LZ #1 mounting block piece 310
- Two—LZ #2 LE root piece 314
- One—LZ #2 TE root piece 316
- Two—LZ #3 LE root piece 320
- One—LZ #3 TE root piece 322
- One—LZ #4 root piece 318
- Two—cap spars 328
- Four—build-up strip 332
- One—build-up strip 330
- One—90 degree main body piece 334
- One—90 degree mounting block piece 312

Preferably, to cut each kit, templates are pressed firmly against the sheet of pre-preg unidirectional carbon fiber 300 on the cutting surface. Preferably, pressure is not excessive enough to cause the pre-preg carbon to stick to the template or the cutting surface. Preferably, a razor sharp utility knife 302 is used to cut the sheet of unidirectional carbon fiber material 300, as shown. Preferably, kit components are labeled appropriately; for example, each piece can be marked with piece indicia 308 indicating which type of piece it is (e.g. LZ #1) and what the orientation of the carbon fibers are (marked with an arrow).

Figure 6:
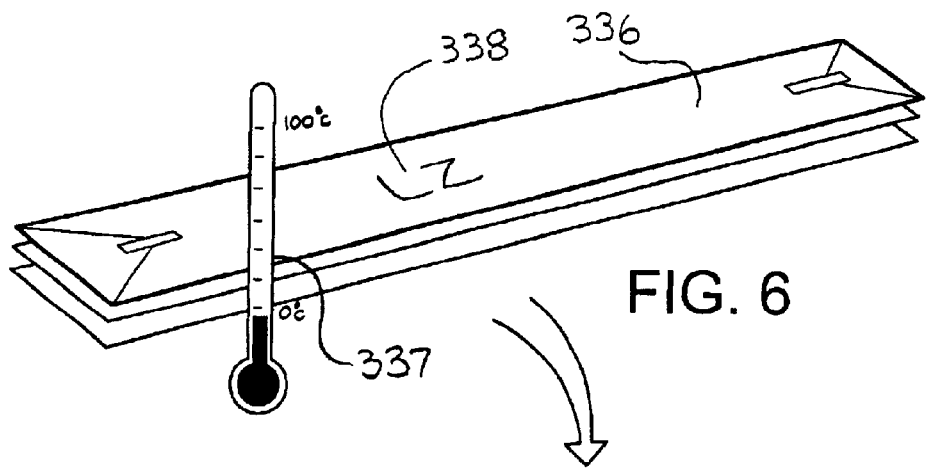
FIG. 6 is a perspective view of a package of carbon-fiber pieces, wrapped together in a bundle for storage, according to a preferred embodiment of the present invention.

Preferably, once all the pieces for one side (for example, the LZ side) have been cut, the complete kit comprising all the pieces for the side are wrapped together with paper for refrigerated storage until they are needed, as shown in FIG. 6. Preferably, wrapper 336 is marked with wrapper indicia 338 indicating the type of turbine blade and which tool side, etc., the kit is for. Preferably, wrapped kits are stored in a refrigerator or freezer at a temperature below zero degrees Celsius (as indicated by thermometer 337) to prevent premature curing of the pre-preg resin.

Preferably, the mounting end of the turbine blade is reinforced with an appliance for extra strength. Preferably the appliance is made from epoxy casting resin. Preferably the epoxy casting resin used is Reichhold B27 Resin from JiangXi Yuanda Chemical Co. Preferably, before the epoxy resin is poured, the appliance tool halves 350 are cleaned and inspected to make sure the appliance tool halves 350 are smooth and do not have any cracks.

Preferably, the appliance tool halves 350 are prepared by waxing. Preferably, the release wax used is PARTALL wax #2. Preferably, clean rags are used to apply the wax onto the appliance tool halves 350 and to buff the waxed surface. Preferably, the appliance tool halves 350 are given one coat of wax. Under appropriate circumstances, more than one coat of wax may be applied.

Preferably, release film is applied, using HVLP (high volume low pressure) paint sprayed onto the waxed appliance tool halves 350. Preferably, the release film used is PARTALL film #10. Preferably, a coat of release film is given about 10–15 minutes to dry. Depending on atmospheric conditions, more or less time may suffice. Preferably, two coats of release film are applied.

Figure 7A:
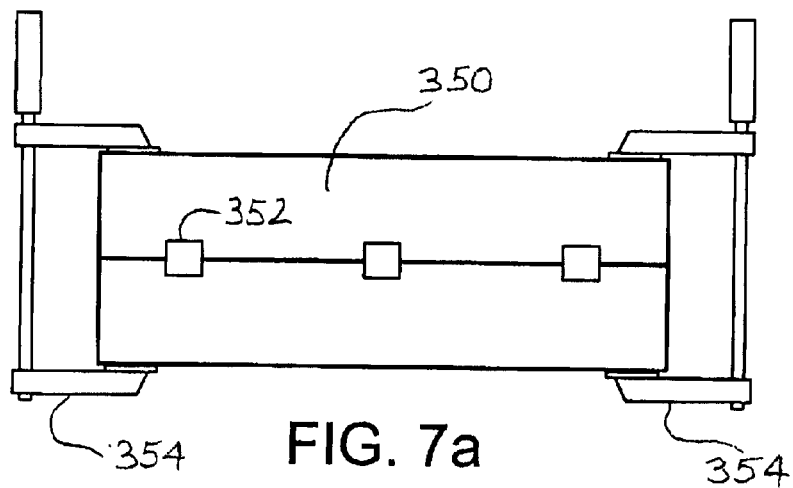
FIG. 7a is a top view of a clamped mold used to make appliances for the turbine blade, according to a preferred embodiment of the present invention.

Preferably, about 55% resin and 45% vermiculite by volume and two drops of black pigment are mixed. Preferably, the black pigment used is carbon black for tints and pigments. Preferably, the appliance tool halves 350 are held together using C-clamps 354 to form a mold, as shown in FIG. 7a. Preferably, the resin mixture is poured into a mold through fill hole 352. The mold may preferably be tilted on its end when pouring to eliminate the chance of having trapped air in the mold since trapped air can severely deformed an appliance.

Figure 7B:
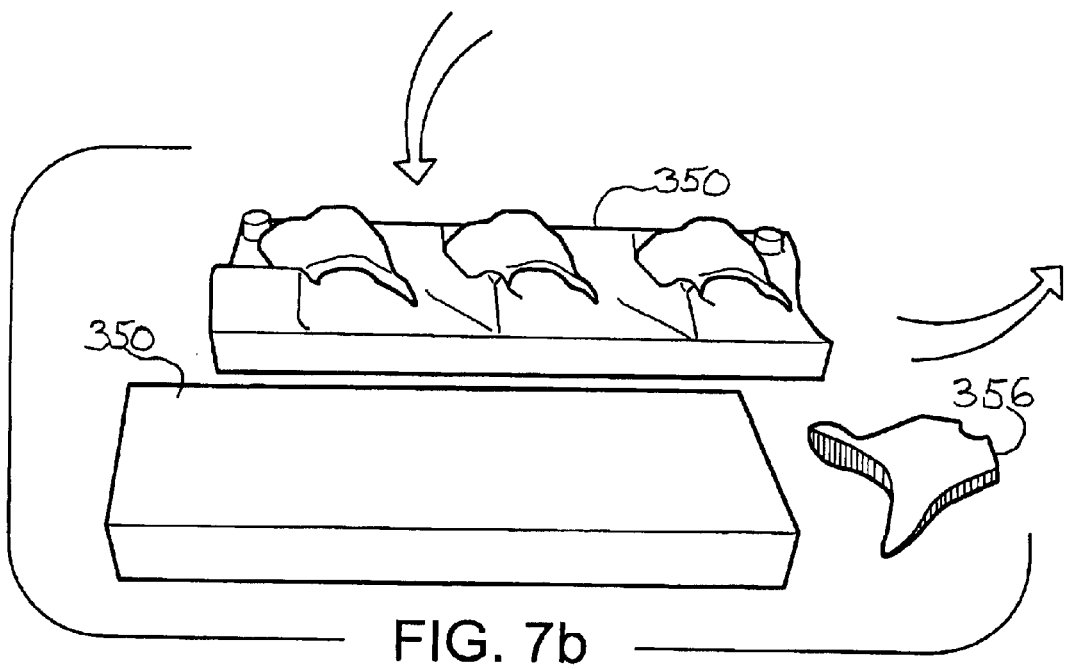

Preferably, the appliance is allowed to cure within the mold for 30 minutes or until the mold cools to room temperature, whichever is longer. FIG. 7b shows an appliance 356 which has been removed from appliance tool halves 350. FIG. 7b shows appliance tool halves 350, which allow three appliance 356 parts to be molded at the same time. Preferably, appliances are allowed to continue curing overnight. Overnight curing time is preferred since some parts of the appliance may still be too soft for trimming. Preferably, after curing is complete, excess material is trimmed off each appliance using, for example, a Dremel tool or belt sander. However, under appropriate circumstances, other means such as sanding paper, etc., may suffice. Preferably, the appliances are weighed using scales and grouped together with other appliances that have nearly identical weight. Preferably, the weight of each appliance is marked on the appliance using a permanent marker. Preferably, appliances are sorted by weight and grouped in sets of 3 (corresponding to a preferred number of blades in a complete set) with similar weight.

Figure 8:
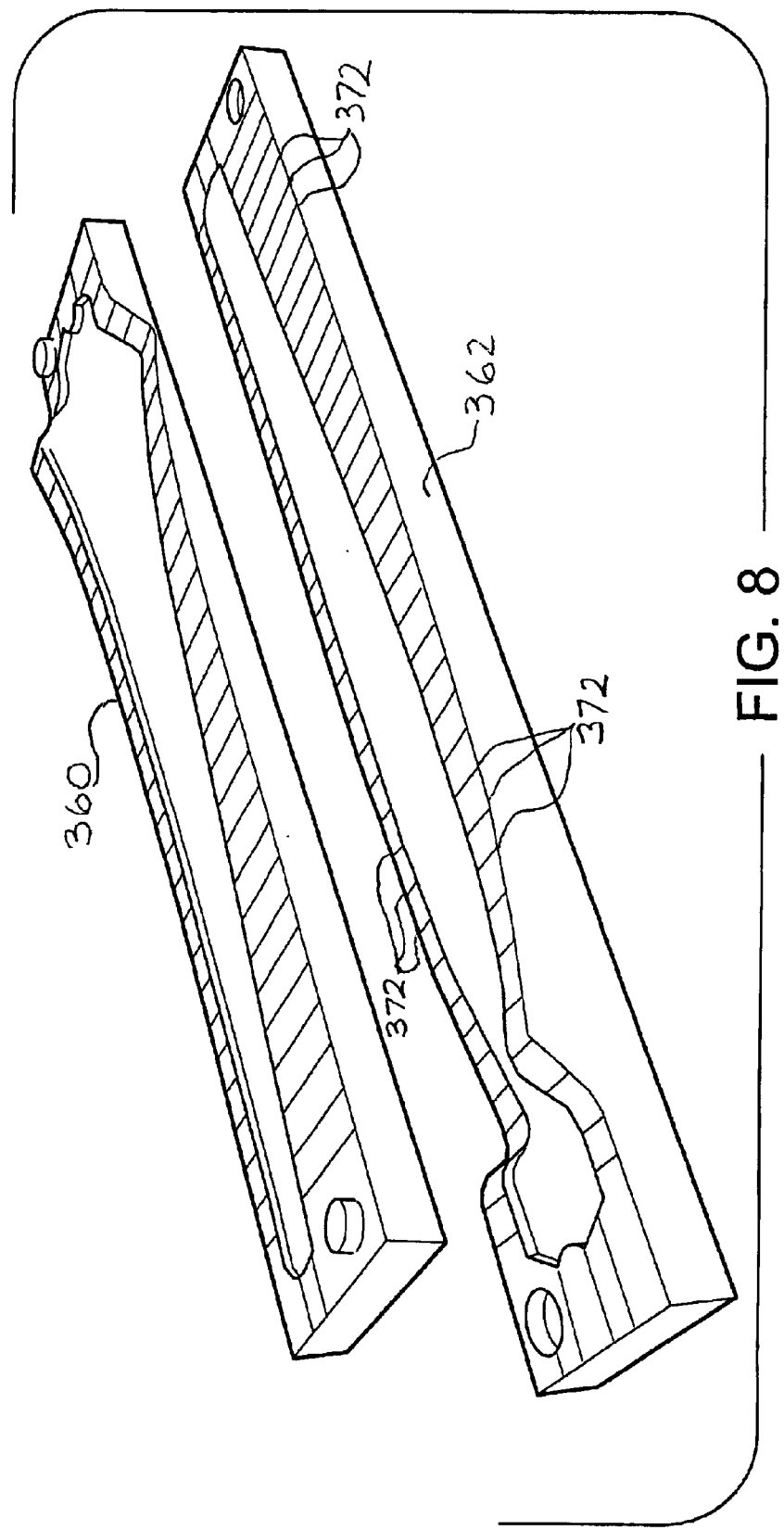
FIG. 8 is a perspective view of the tools (together forming a mold) used in making the turbine blade, according to a preferred embodiment of the present invention.
Figure 9A:
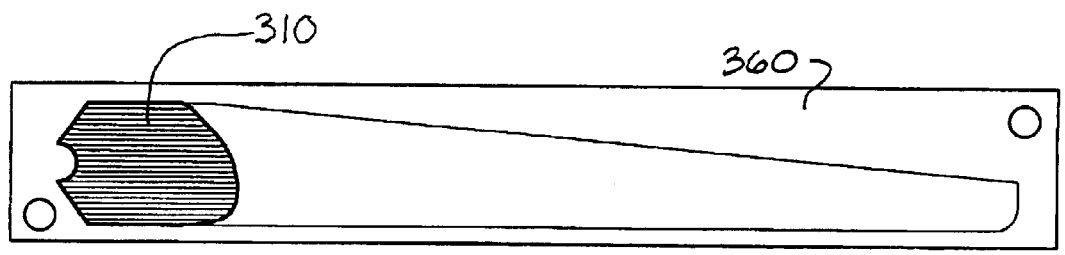
FIGS. 9a–9p are top views of the preferable order of placing unidirectional carbon fiber pieces into one of the tools, according to a preferred embodiment of the present invention.
Figure 9B:
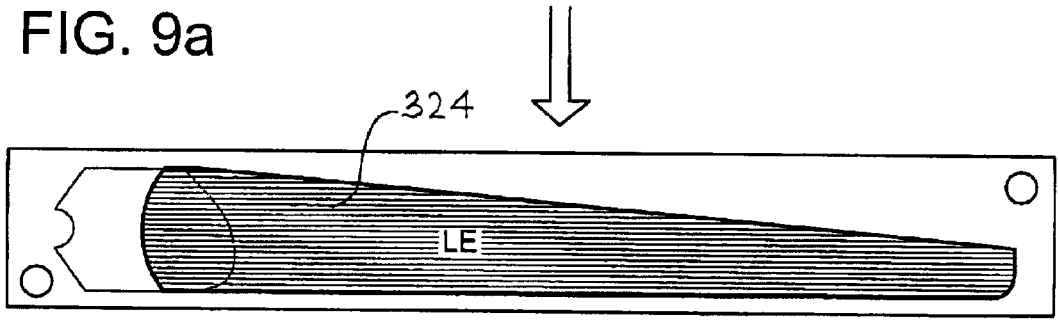
Figure 9C:
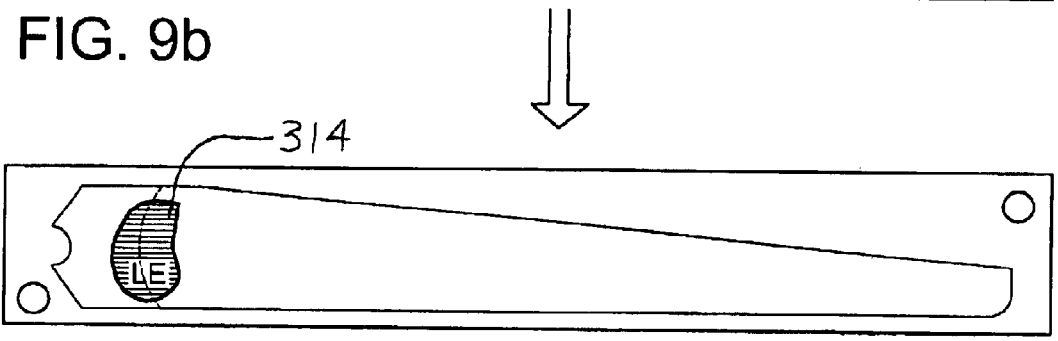
Figure 9D:
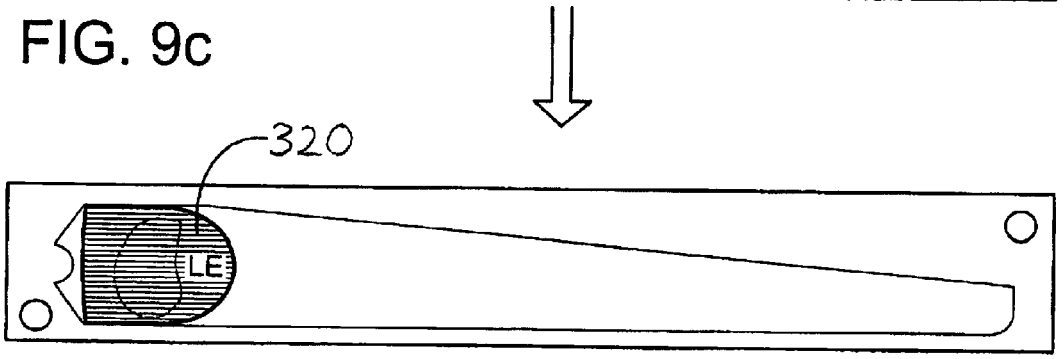
Figure 9E:
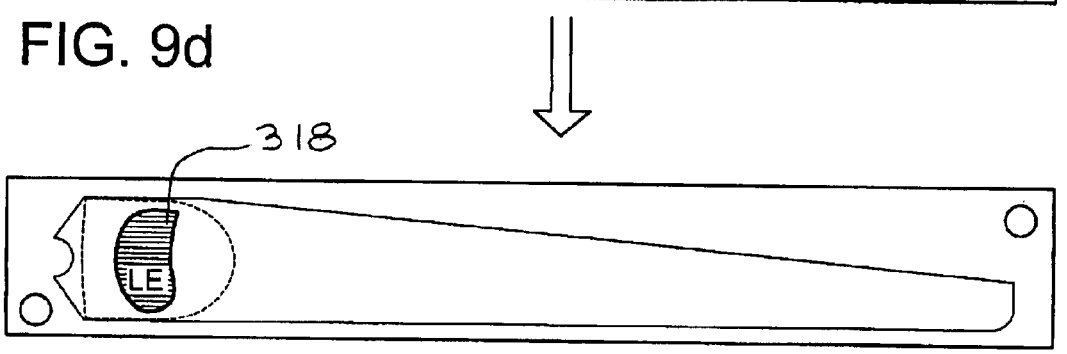

FIG. 8 shows LZ tool 360 and DZ tool 362, which fit together to form the mold for the turbine blade. Preferably, tool release agents are applied every fifth time the tool is used. Preferably, the LZ tool 360, and DZ tool 362, have outlet channels 372 (discussed later). Preferably, during the lay up process, there should be at least 0.5" of overlap from side to side between two pieces of the same layer. Preferably, the tools are pre-heated if necessary up to the point where the cut pre-preg carbon fiber is pliable enough but the tools are not too hot to touch. The following steps are preferred in making the turbine blade:

1. Make sure each tool is inspected to make sure it is clean.
2. Prepare the tools for lay-up process by waxing the lay-up surface and buff the wax using clean rags. Apply two coats of wax on the tools before each lay-up.
3. Spray the tools with Partall Film #10 using the HVLP paint spray to release the tools. Let the release film dry. It usually takes about 15 minutes for the release film to dry, depending on local atmospheric conditions (temperature and humidity). Apply two coats of release film before each lay-up process.
4. If necessary, warm the tools by placing each of them on a heat table. The use of heat table is usually required during the fall and winter seasons. Placing the tools on the heat table may not be necessary if the pre-preg carbon fiber material is easy enough to work with at room temperature.
5. Lay up an LZ #1 mounting block piece 310, as shown in FIG. 9a.
6. Lay up an LZ LE main body piece 324, as shown in FIG. 9b, which fiber is oriented to be parallel with the leading edge (LE) of the blade. Application should start from the tip area.
7. Lay up an LZ #2 LE root piece 314 as shown in FIG. 9c.
8. Lay up an LZ #3 LE root piece 320 as shown in FIG. 9d.
9. Lay up an LZ #4 root piece 318 as shown in FIG. 9e.
10. Lay up an LZ TE main body piece 326, as shown in FIG. 9f. Application should start from the tip area.
11. Lay up an LZ #2 TE 316 root piece with trailing edge orientation, as shown in FIG. 9g.
12. Lay up an LZ #3 TE root piece 322, as shown in FIG. 9h.

Figure 9P:
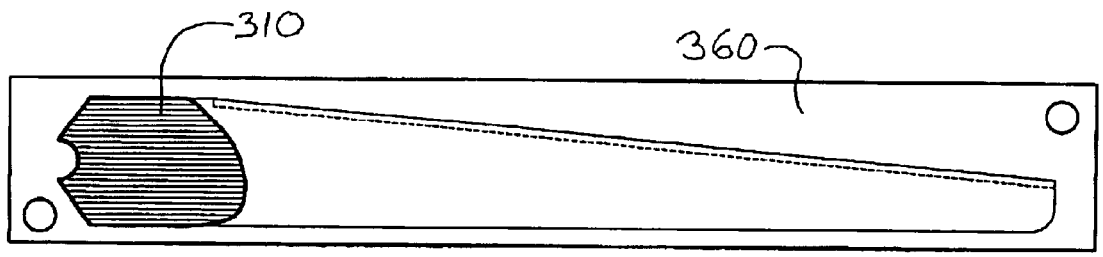

13. Repeat Steps 6 through 8 one time.
14. Lay up an LZ 90-degree main body piece 334, starting at the tip. This piece must be applied onto the center of the blade chord-lengthwise, as shown in FIG. 9j.
15. Lay up an LZ 90-degree mounting block piece 312, as shown in FIG. 9k.
16. Lay up an LZ cap spar piece 328 starting at the tip on the center. Cap spar must be laid up in manner that it is at 25% chord from the leading edge at the root, as shown in FIG. 9l.
17. Lay up a second LZ cap spar piece 328 directly on top of the previous one, starting at 1 inch from the tip, as shown in FIG. 9m.
18. Lay up a quarter-inch-wide build-up strip 332 for the leading edge starting at the end of the round corner of the tip, as shown in FIG. 9n.
19. Lay up a second quarter-inch-wide build-up strip 332 on top of the first.
20. Lay up a third quarter-inch-wide build-up strip 332 on top of the second.
21. Lay up a half-inch-wide build-up strip 330 along the trailing edge. Start the lay up from the tip, as shown in FIG. 9o.
22. Lay up a quarter-inch-wide build-up strip 332 along the trailing edge in similar manner as in Step 21.
23. Lay up an LZ #1 mounting block piece 310, as shown in FIG. 9p.
24. Now that all the LZ carbon fiber pieces for the LZ tool 360 have been placed, lay up all the corresponding DZ carbon fiber pieces for the DZ tool 362, in similar fashion.

Preferably, after the LZ and DZ tools have been prepared as described above, a potting mixture is used to bond appliance 356 within the turbine blade, and to fill in any gaps between appliance 356 and the carbon-fiber shell of the turbine blade, according to the following steps:

1. Prepare the potting mixture.
2. Potting is made of the resin/hardener mixture (80 grams of B27 resin, 20 grams of A14 hardener, and a couple of drops of black pigment). Vermiculite is added into the mixture until the desired consistency is reached.
3. Apply the potting mix as soon as the tool is ready. Apply potting along the vertical sides of the appliance.

Figure 10:
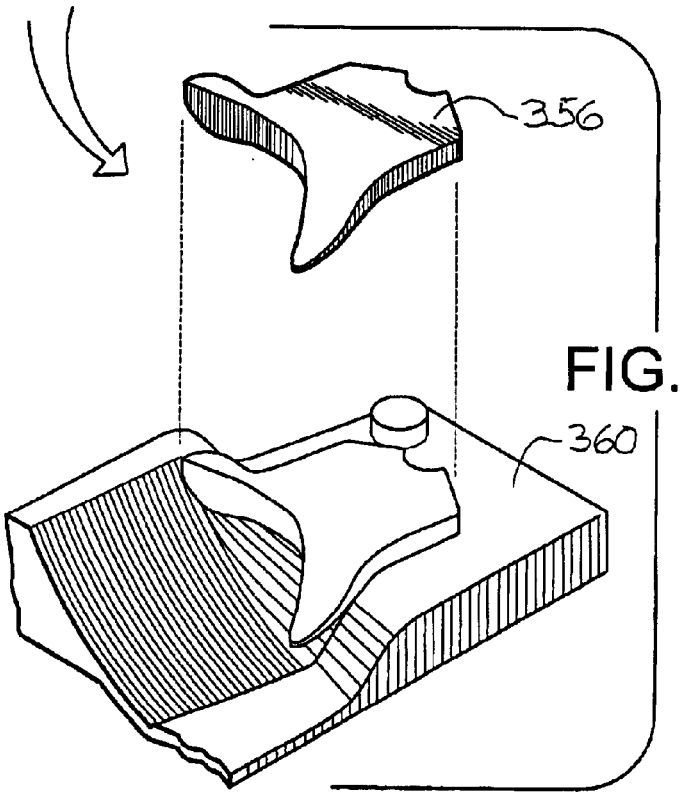
FIG. 10 is perspective view of an appliance being inserted into the tool, according to a preferred embodiment of the present invention.
Figure 10A:
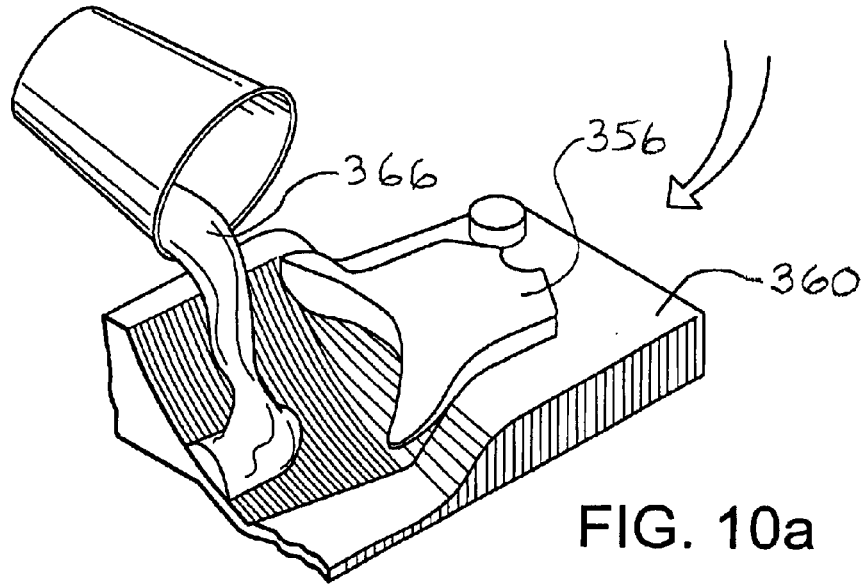
FIG. 10a is a perspective view of the expanding foam being poured into the tool, according to a preferred embodiment of the present invention.
Figure 11:
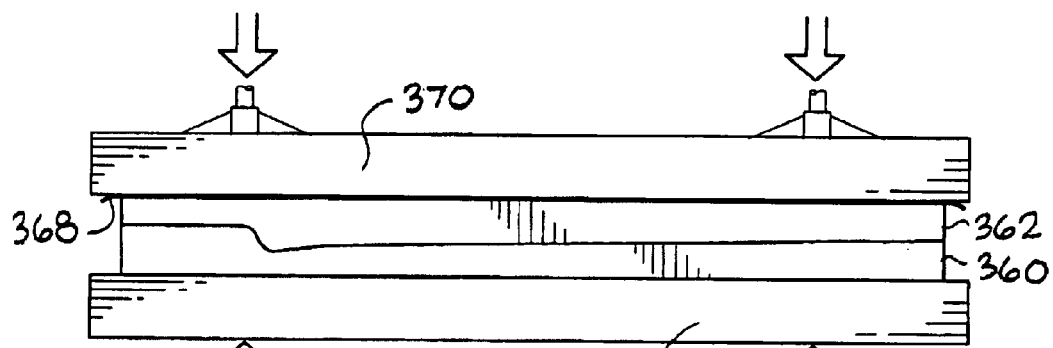
FIG. 11 is a side view of the two tools (together forming a mold), being pressed together by a press, according to a preferred embodiment of the present invention.
Figure 12A:
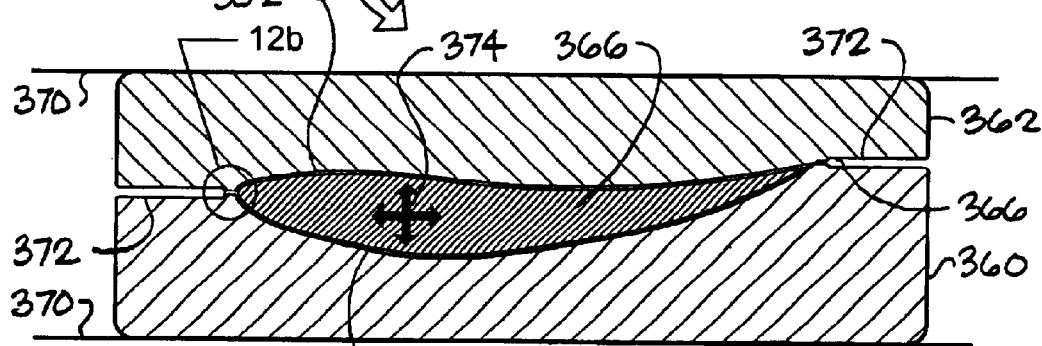
FIG. 12a is a sectional view through section 12—12 of FIG. 11, showing some expanding foam escaping through outlet channels, according to a preferred embodiment of the present invention.
Figure 12B:
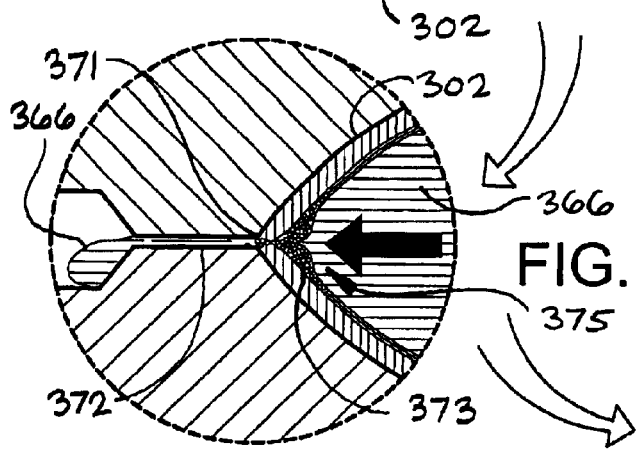
FIG. 12b is a close-up view of a portion of FIG. 12a, showing detail of the carbon fiber build-up that clogs the outlet channel, thereby forming a strong bond at the seam.
Figure 13:
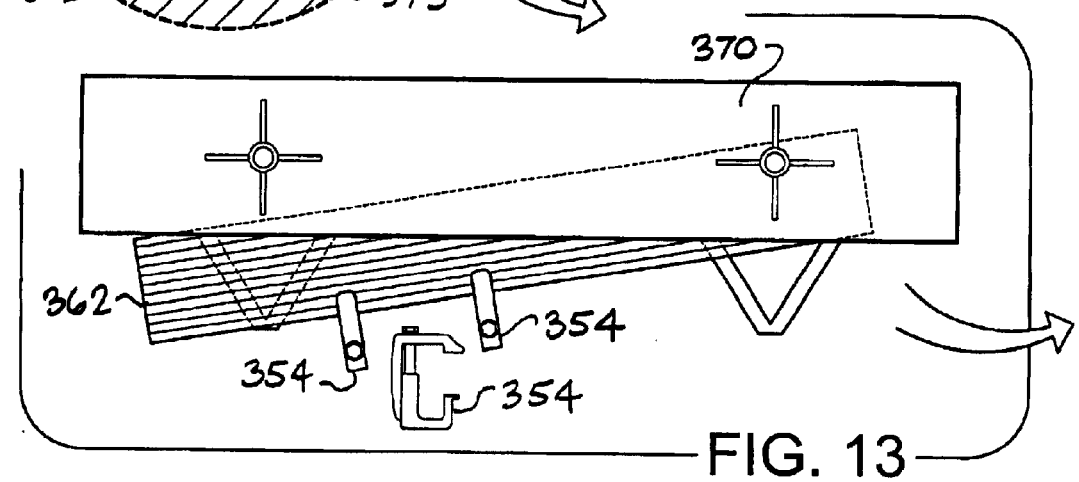
FIG. 13 is a top view of the tools being partially removed from the press and being immediately clamped together, before being completely removed from the press, according to a preferred embodiment of the present invention.

Preferably, after appliance 356 and potting mixture have been placed (as shown in FIG. 10), the foam (polyisocyanurate in this example) is added according to the following steps:

1. Mix 161 grams of Part A (the resin part) plus 2 drops of water, and 153 grams of Part B (the accelerator part) plus 2 drops of water using a pneumatic mixer. Consistent mixture foam core is necessary to produce a properly cured blade. Once A and B are mixed, there are only 10 seconds for safely pouring the expanding foam 366 into the LZ tool (as shown in FIG. 10a), placing the DZ tool on top (to form the mold for the blade) and putting the assembled mold into the press.
2. Immediately place rubber mat 368 on the top of the tool, slide the tools into the press, and press until both LZ and DZ side of the tools meet throughout the entire length. During this step the foam expands to fill the void between LZ tool 360 and DZ tool 362. As shown in FIG. 12a, the pressure 374 of the expanding foam 366 compresses the pre-preg carbon fiber pieces together, assisting in bonding the sheets to each other. The pressure 374 of the expanding foam 366 also assists in bonding the foam to the pre-preg carbon fiber outer skin 302 of the turbine blade. Outlet channels 372 are placed around the periphery at the interface between LZ tool 360 and DZ tool 362 to allow excess pressure (including gasses) and foam to escape. Outlet channels 372 are located and sized so to allow sufficient (but not excessive) pressure 374 to build up inside of mold created by the LZ tool 360 and DZ tool 362. FIG. 12b is a close-up view of a portion of FIG. 12a, showing detail of the carbon fiber 373 build-up that clogs the outlet channel 372 creating a plug 375 (and collecting fiber at the parting line edge of the blade), thereby forming a strong bond at the bond line 371 seam (as further elaborated on later in this specification).
3. Let tools sit to cool down for 15 minutes or until the tools reach room temperature, whichever takes longer.
4. Pull part of the tools out the press for clamping, as shown in FIG. 13. Do not pull the entire tool assembly out of the press at one time (to prevent de-molding). The tool is only pulled out a section at the time to clamp the tools using six clamps 354. The six clamps 354 are used in pairs on the ends and the middle section of the tools. Once the tools are clamped down with six clamps 354, then clamp the all sides of the tools with the rest of the clamps. Do not over-tighten the clamps.
5. Place the tools in oven 376 pre-heated to 250 degrees Fahrenheit, as shown in FIG. 14. Let the turbine blade cure in the oven for 2.5 hours at 250 degrees Fahrenheit.
6. After the above-mentioned 2.5 hours, take the tools out of oven 376 and let them cool down to room temperature with the aid of a fan. Cooling down usually takes about 30–45 minutes.
7. Once the tools have reached room temperature, de-molding may begin.
8. Unclamp the tools. A flexible plastic putty knife may be use to scrape off the excess potting outside the tool. Use a plastic knife to separate the LZ and DZ tools. De-mold the blade off the tool, as shown in FIG. 15. If necessary, a flexible putty knife may be used to assist the de-molding of the blade. CAUTION must be kept so that the putty knife does not scratch the blade.
9. Scrape excess material 378 off the tools using plastic knife, preferably. Use metal putty knife only if a plastic knife does not work.
10. Wipe the tool clean using clean rags.
11. Re-apply release agent if the tool has been used five times since the last application of release agent. Follow the directions on the container of the release agent. The tool may now be use for another bond lay-up process or stored.
12. Trim any excess material 378 off the blade (as shown in FIG. 16) until excess material 378 is removed (as shown in FIG. 17). Trimming is done using tools such as belt sander, Dremel tools, or other trimming tool 379, etc. DO NOT over-sand. Over-sanding can cause blade deformation.
14. Clean the blade.
15. Drill the mounting holes by using the drill jig 380, as shown in FIG. 18. Insert the blade into the drill jig so that the DZ side is facing up. Fit the blade properly into drill jig 380 before clamping the blade down. Use a drill press, preferably, or you may use a cordless/portable drill to drill the mounting holes.

Preferably, after the mounting holes for the turbine blade have been drilled, the turbine blade is trimmed and painted according to the following steps:

1. The turbine blade is trimmed until the desired shape is achieved. The trimming is preferably done by sanding. Sanding may be done with just a sand paper or attached to a sanding tool of any appropriate kind to save time.
2. The mounting block should be chamfered using a DREMEL tool to make the removal of excess cured resin off the sides of the mounting block easier.
3. Use 3M Acryl-Green Spot Putty system, or any other current patching system, to patch any imperfection on the blade after trimming. Let compound cure overnight to achieve desired patching properties. Once the patch has cured, sand the excess compound off the blade to achieve desired blade shape.
4. Prepare the HVLP Paint Spray system by getting rid of trapped moisture off the air-line and inspecting the HVLP Paint Spray System for any clogging. If there is any clogging, try to remove it using lacquer thinner. Spray lacquer thinner away from the blades. Failure to clear the air-lines of trapped moisture and clogs of the HVLP Paint Spray will result in poor blade surface finish.
5. Place the blades on the mounting system. Apply a first coat of black paint 384 onto the turbine blade 120, as shown in FIG. 19. Each paint system, including the clear coat system, has its own directions for proper use. Follow the directions of the clear coat paint system or any other system currently being used to paint the blade for proper finishing results.
6. Apply two coats of paint 384 onto the blades. Each coat must be wet sanded with a 1000 grit wet sand paper prior to application of a paint coat. Make sure that each coat is completely dry before wet sanding. Follow current paint system for proper drying procedure.

Preferably, after the turbine blades are painted, they are balanced according to the following steps:

1. Group turbine blades into sets of three that are closely matched by weight to get a family of blades. A family of blades is a set of 3 blades where the weight of one blade is relatively close to the other two.
2. Take any two blades from a set and mount them on the balancing system 390, as shown in FIG. 20. Find the blades with the greatest moment of the three. Balance the moment of each of the lighter two blades with respect to the heaviest one. The blades are balanced two at a time, as shown in FIG. 20.
3. Before balancing the blades, apply a helicopter leading edge tape of 1"×28" on each blade. Each tape must be applied onto a blade at identical location for all three blades.
   4. When two blades are ready to be balanced, take two shot cups and place each cup on a blade. Each cup is to be place on the mounting block region and must be at the same distance from the fulcrum as the other cup. Pour the appropriate amount of lead shots into the cup on the lighter blade to balance the system out.
5. When balancing, the amount of resin and hardener and the amount of mass drilled out of the blade after the balancing must be taken into consideration.
6. Take the blade and the required lead shots out of the balancing system and place them in a safe place.
7. Repeat Step 3 and 4 for the third blade.
8. Once all three blades are balanced out moment-wise, drill the mounting block at the location where the lead shot filled cup was placed for balancing.
9. Mix the B40 resin and H595 hardener. The mixture is called "10-2"; the mix is 10-parts B40 and 2-parts H595 by weight. Add a drop of black pigment into the mixture. Mix properly. The mixture must be made for one blade at a time.
10. Pour all of the lead shot 394 required to balance a blade into the mixture. Pour the resin-hardener-lead-shot mixture into the appropriate blade.
11. When all the lead shot has 394 been poured into the appropriate blade (as shown in FIG. 20), seal the hole with 10-2 mixture. Trim off the 10-2 excess with a putty knife.
12. Sand off any remaining 10-2 excess if necessary after the mixture is fully cured.
13. Apply a touch up paint onto the seal. Use a Hi-Gloss black spray paint.

Preferably, after the turbine blades are painted, they are marked with indicia and wrapped according to the following steps:

1. Once the touch-up paint has dried, a serial number is scribed onto each blade and one records the number in a file. The record must include the serial number, the weight of the blade, and date of production. Each blade of a set should have the same serial number; however, at the end of a serial number of a blade a letter should be scribed. The letters are A, B, and C, respectively for each blade (for a set of three matched turbine blades).
2. Wrap the family of blades with a cushioning protective layer. There should be a protective layer between each blade. There should be at least two protective layers when wrapping the whole set of blades.
3. Write the serial number without the letters on the wrapping for sales purposes.
4. Place the wrapped sets in the appropriate storage.

It is noted that the Hybrid polyurethane foam and epoxy vermiculite foam core has several advantages over prior art systems. Preferably, a predetermined mass of low pressure polyisocyanurate or polyurethane foam is utilized.

The exothermal reaction of the expanding foam generates heat which assists in curing the pre-preg resin skin from within the interior of the blade, thus allowing for the curing cycle to be accelerated via the use of both interiorly generated exothermal heat combined with the externally oven generated heat. This reduces the normal oven cure time requirement by approximately 15% and reduces the tool or mold exposure to heat, thus increasing the life cycle and longevity of the tooling.

Excess foam under pressure is allowed to escape through the outlet channels (spaced along the part line, sometimes called "parting line", between the two parts which together make the mold). The lands (which create the outlet channels) are carefully tuned by increasing or decreasing the depth; the usual variance in depth change has been found to be about one 20-thousandth to about one-40 thousandth of an inch. After the expansive exhaust phase (when the foam is expanding and displacing air within the mold cavity), the tool is placed in an oven. At this point the thermal-setting pre-preg resin system becomes warm and viscous as it penetrates and combines with the polyurethane or polyisocyanurate resin at the bond line. Very little foam resin is residual in this area after exhaust and the end result is a bond line with no compromise in structural integrity due to reintegration of the pre-preg thermal set resin system at the bond line. The bond line is the seam where the LZ portion and the DZ portion meet.

The process allows for the use of other than highly expensive syntactic foam resin systems and also the use of other than extremely expensive glass and non-organic micro balloons. Non-organic micro-balloons can absorb moisture that can cause out of balance conditions resulting in vibration and potential failure of wind turbine operating systems. Expensive glass micro spheres are cost prohibitive and non cost effective in the manufacture of wind turbine blades (inefficient/cost prohibitive for producing energy) and other product that must be marketed in developing countries. Use of syntactic foam and micro-balloons core materials can increase the cost of a WTG blade core by up to 1000%.

Polyisocyanurate foam produces a more cost effective non structural lightweight foam core that will out perform syntactic and micro-balloons cores with comparable weight reduction and a drastic reduction in cost, elimination of water weight absorbs ion problems while producing a grade A finished part.

Superior bond or part line integrity is achieved via the utilization of internal pressure (foam expansion) and exothermal reaction that produces internal heat, when combined with external pressure, force excellent laminate quality of the composite fibers and optimal surface quality in a structurally reinforced carbon fiber or other tooling system.

Foam core resin exhausting through the outlet channels (along the part line) of the tooling flange region provides adhesive friction tow creating a build up carbon fibers about and along the edge the bond line. Fiber infiltration into and beyond the bond line provides optimal structural integrity to the most critical element of the blade structure (see FIG. 12b).

This method produces a bond or part line that is dense in carbon fibers near the part line that is structurally superior to potted or adhesive bonded blades or parts (skins that are simply bonded or glued together). Because fibers are partially exhausted out through the outlet channels of the part line, a fiber buildup results producing a plug of carbon fibers and resin. After the exhaust channels are plugged, pressure buildup of the expanding foam assists in melding the carbon fiber material together into a strong unitary seam.

Leading and trailing edge buildup pre-preg composite material is stiff and tacky in its cool or room temp state, and this makes it nearly impossible without damage or deformation to the skin lay-up to manually move or migrate the build-up material once it has been placed into the tool and pressed against the previously installed tacky composite layers of pre-preg below or next to the tool surface. The process above achieves the proper migration of carbon and resin to the seam, automatically without the requirement of manual manipulation.

Lubrication for this slipping and sliding event (buildup of the plug) is provided by the thermal set resin within the pre-preg carbon fiber. As the interior exothermal reaction of the expansive foam heats the previously frozen resin, the resin is transformed into a thin viscous lubricant (prior to its acceleration in to b-stage or gel stage where it begins to stabilize prior to entering the c-stage or cure stage). At this point the pre-preg fibers have piled in to the bond line area creating an intermingled density-optimized fiber weld of the two (upper and lower skins into one integral global structural geometry or combined skin. Increasing pressure during the curing process adds additional pressure to the area ensuring for optimal lamination compression of the fibers at, within, and in the bond line, (thus virtually eliminating the bond line). A single structural skin emerges from the tool at the end of the production cycle which is important since bond line integrity is critical to wind turbine blade performance and expected field life.

Figure 21:
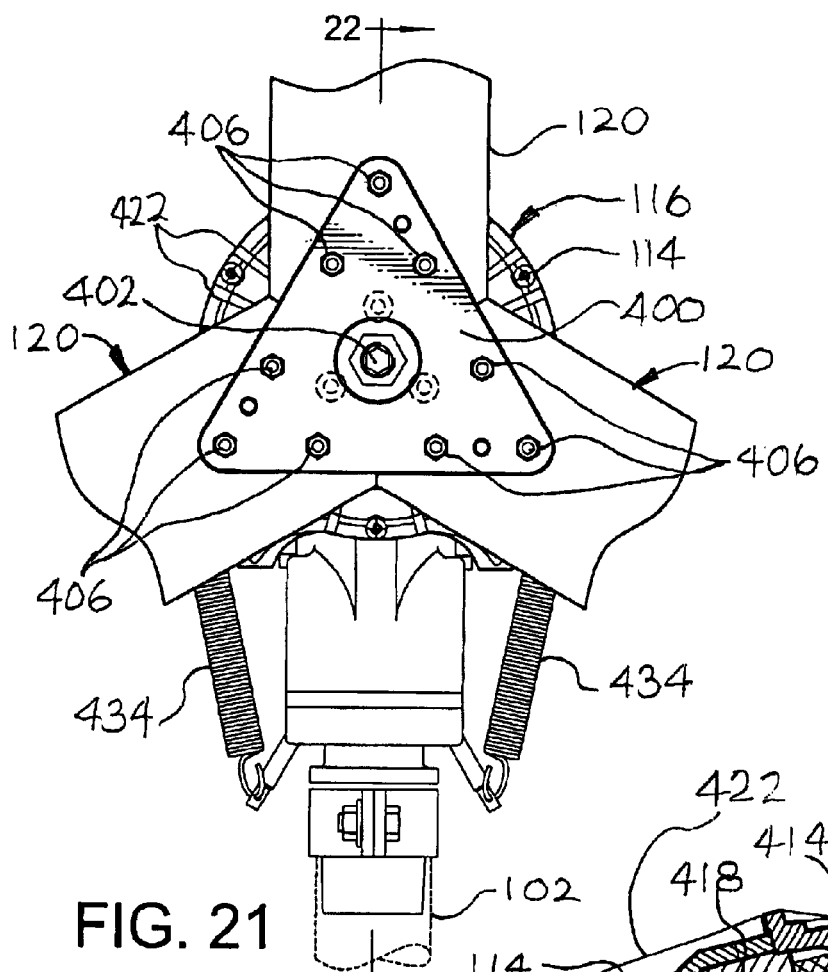
FIG. 21 is a front view illustrating a preferred array of three rotor blades mounted to a 900-watt wind powered electrical generator according to the embodiment of FIG. 1.

FIG. 21 is a front view illustrating a preferred array of three rotor blade(s) 120 mounted to a 900-watt, wind-powered, electrical generator 116 according to the embodiment of FIG. 1. Rotor blade(s) 120, of the size and construction described within FIG. 2a through FIG. 20, are especially well suited for use on electrical generating wind turbines in the 600 to 900 watt range.

In such wind turbine systems of such intermediate size, the inherent weight and inertial mass savings achieved by the above-described blade technology tends to result in less costly turbines and supporting structures. Additionally, as those skilled in the art will now appreciate upon reading this specification, the use of rotor blade(s) 120 on intermediate sized wind turbine systems will result in increased overall in-service system performance and durability. As previously illustrated (see FIG. 2a), the mounting end(s) 310 of rotor blade(s) 120 are preferably chamfered to allow symmetrically adjacent positioning of the blades about a central point (in the present illustration, this central point comprises the longitudinal axis 404 of shaft 402), as shown. Preferably, a triangular shaped mounting plate assembly 400 is used to firmly anchor rotor blade(s) 120 to generator shaft 402, as shown. In preferred operation, the enlarged contact area between mounting plate assembly 400 and rotor blade(s) 120 serves to evenly distribute blade forces across the outer surface of mounting end 310, thereby minimizing destructive shear forces at mounting bolts 406 under load.

Figure 22:
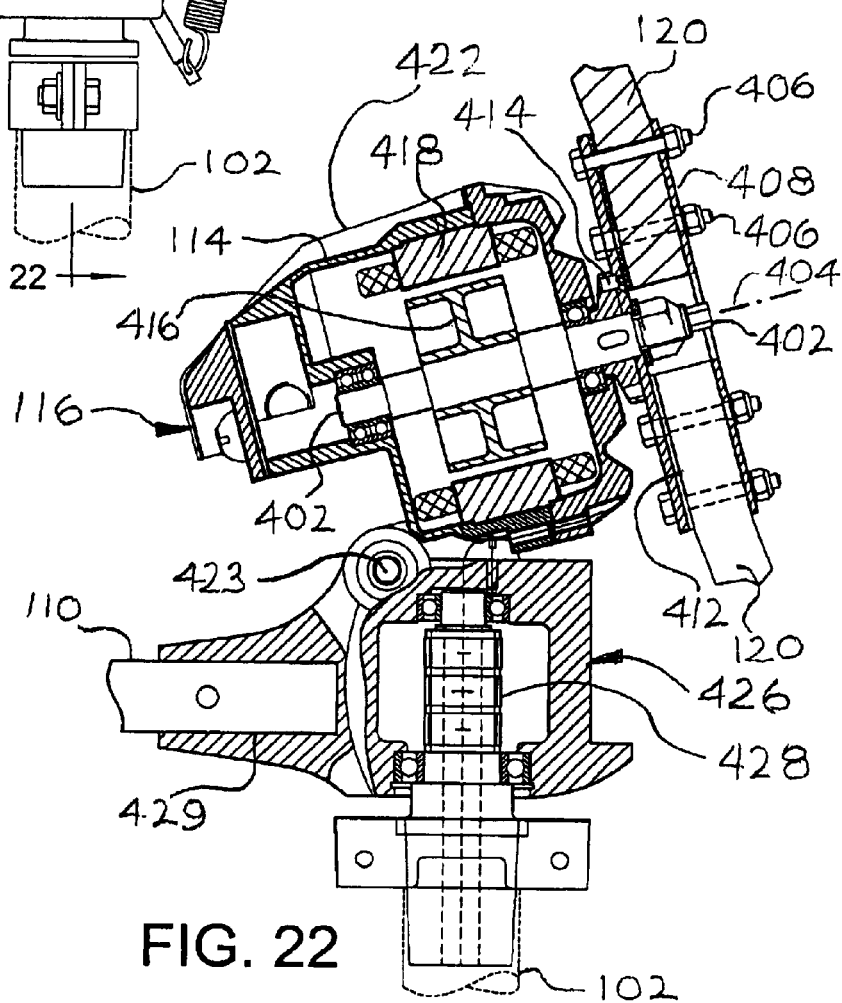
FIG. 22 is a sectional view through section 22—22 of FIG. 21 illustrating a preferred mounting arrangement of rotor blades, mounting plate assembly, and internal components of the generator.

FIG. 22 is the cross sectional view 22—22 of FIG. 21 illustrating the preferred mounting arrangement of rotor blade(s) 120, mounting plate assembly 400 and internal components of generator 116. Preferably, mounting plate assembly 400 comprises a ⅛" thick stainless steel hub cover 408, a ³⁄₁₆" thick stainless steel hub plate 410, two neoprene damper(s) 412, a stainless steel torque ring 414 and nine M6×55 stainless steel mounting bolts 406, as shown. Preferably, each rotor blade 120 is retained on mounting plate assembly 400 by a grouping of three mounting bolts 406, arranged as shown. Preferably, rotor blade(s) 120 are clamped between hub cover 408 and hub plate 410 by tightening mounting bolts 406 to form a unified force transmitting structure, as shown. ³⁄₃₂" thick neoprene damper(s) 412, positioned between each rotor blade 120 and mounting plate assembly 400, dampen vibration developed within rotor blade(s) 120. Preferably, mounting plate assembly 400 is rigidly anchored to torque ring 414 and generator shaft 402, as shown.

Generator 116 is preferably a simple and durable mechanical assembly producing about 600 to 900 watts at about 800 RPM. Preferably, generator 116 comprises an 8-pole rotor 416 (mounted along generator shaft 402) operating within stator assembly 418, as shown. To provide a high level of output, 8-pole rotor 416 preferably comprises rare earth neodymium iron boron permanent magnets, as shown. Stator assembly 418 is preferably arranged to provide an A/C output. Upon reading this specification, those skilled in the art will now understand that, under appropriate circumstances, considering issues such as production cost, material selection, convenience, etc., other power generating apparatus not limited to high performance 600 watt to 900 watt alternators, may suffice. Heat generated during operation is preferably transmitted from stator assembly 418 to the adjacent anodized aluminum generator housing assembly 114, as shown. Preferably, the exterior of aluminum generator housing assembly 114 is cast with a plurality of heat dissipating fins 422, as shown. During preferred operation, the heat transmitted from stator assembly 418 is radiated away from generator 116 and into the air stream passing adjacent fins 422. The preferred use of heat dissipating fins 422 allows generator 116 to maintain optimum output levels without the thermal degradation common in similar scale units.

The applicant has determined through field-testing that the example low inertia three-blade array is capable of initiating generator shaft rotation (start-up) in wind speeds as low as 6 mph.

Preferably, the generator housing assembly 114 is pivotally mounted to aluminum support body 426 at pivot point 423, as shown. Support body 426 preferably comprises a power transfer assembly 428, tail boom socket 429, yaw bearing 430 and upper pole engagement fitting and clamp 432, as shown.

Preferably, to prevent excessive generator shaft speed during high wind conditions, the system utilizes an automatic pitch adjustment feature to precipitate a state of aerodynamic blade stall under high wind loads. Under high wind loading, generator shaft 402 rotates in an upward direction about pivot point 423, effectively reducing aerodynamic lift at rotor blade(s) 120. Return spring(s) 434 (see FIG. 21) are preferably used to return the system to a normal operating position.

Figure 23:
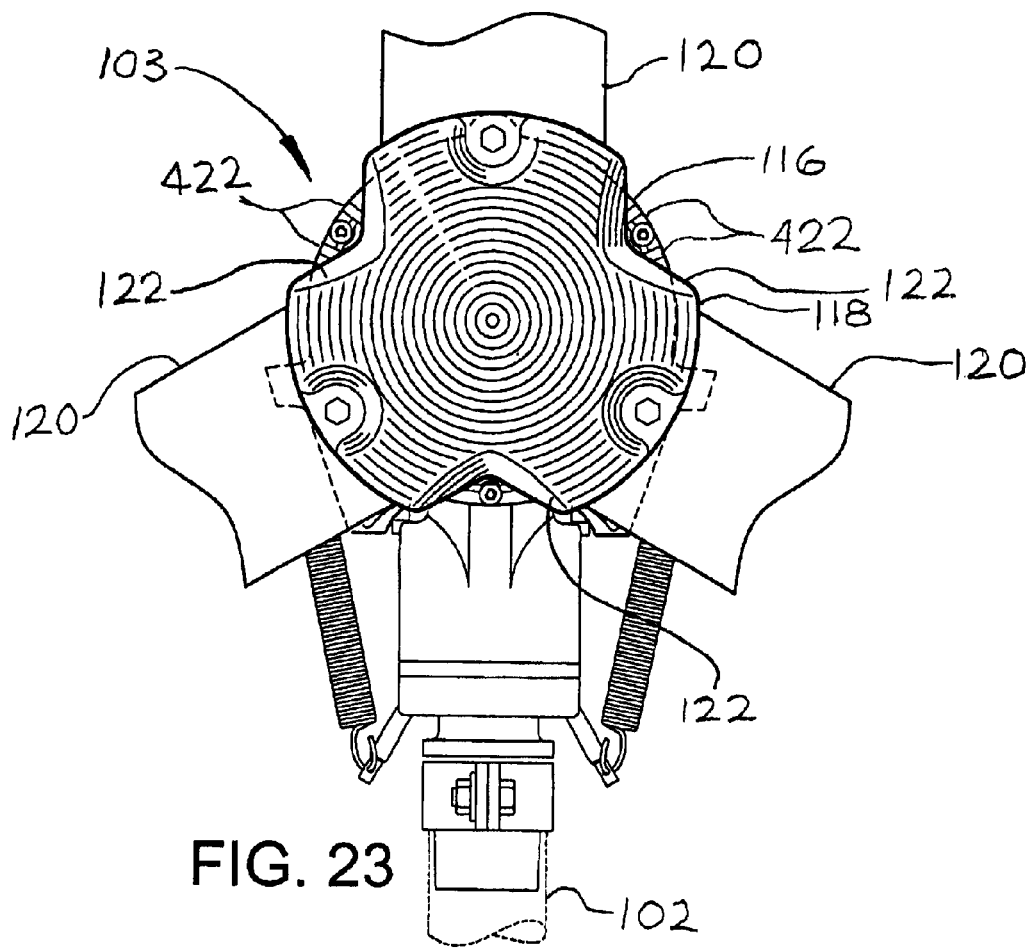
FIG. 23 is a front view of the wind turbine system, fitted with an air-ducting nose cone, according to the preferred embodiment of FIG. 1.
Figure 24:
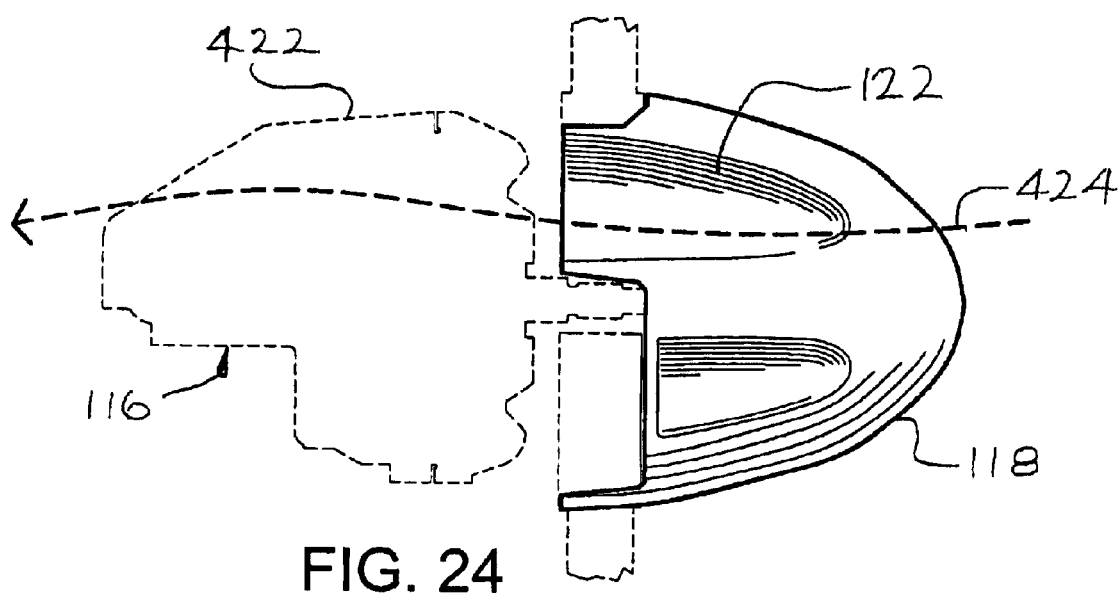
FIG. 24 is a side view of an air-ducting nose cone, positioned within a passing air stream, according to a preferred embodiment of the present invention.

FIG. 23 is a front view of wind turbine 103, fitted with air-ducting nose cone 118, according to the preferred embodiment of FIG. 1. Preferably, nose cone 118 comprises a plurality of peripheral notch(es) 122 adapted to direct additional cooling air towards the heat dissipating fins 422 of generator 116, as shown. More specifically, peripheral notch(es) 122 comprise an aerodynamic collective surface area that channels airflow through the concaved shape of peripheral notch 122 to produce a combined and accelerated airflow velocity. Such peripheral notch(es) 122 funnel airflow evenly and protectively across the heat dissipating fins 422 (as shown in FIG. 24). Additionally, air-ducting nose cone 118 reduces turbulent down stream vortices that would otherwise be present with non-ducted nose cones that extend outwardly beyond the diameter of generator 116 (causing air stagnation and retarded cooling operation).

FIG. 24 is a side view of nose cone 118, positioned within passing air stream 424, according to a preferred embodiment of the present invention. Preferably, nose cone 118 comprises a lightweight shell, preferably constructed from a rigid molded plastic, preferably ABS. Upon reading this specification, those skilled in the art will now understand that, under appropriate circumstances, considering issues such as production cost, material selection, convenience, etc., other nose cone materials, such as fiberglass, aluminum or carbon fiber composites, may suffice.

Figure 25:
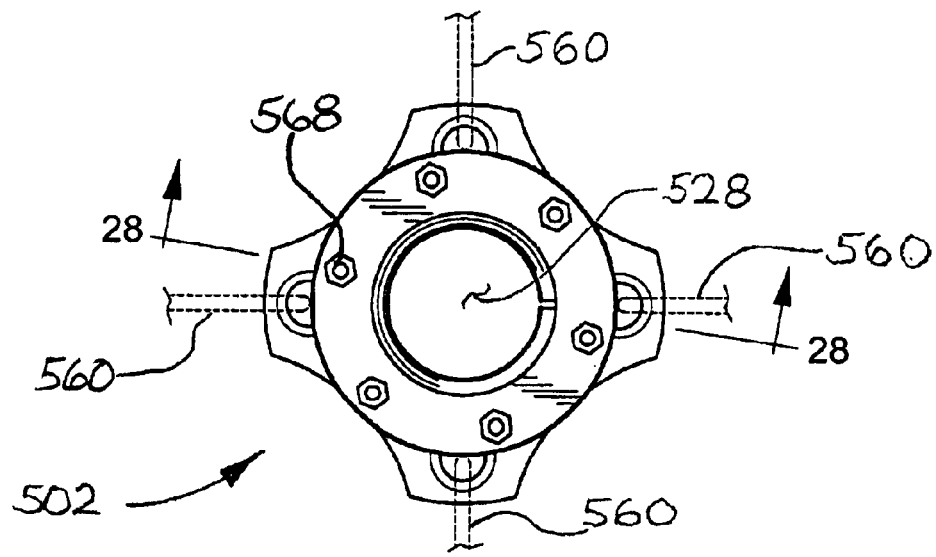
FIG. 25 is a top view of a compression coupler according to a preferred embodiment of the present invention.
Figure 26:
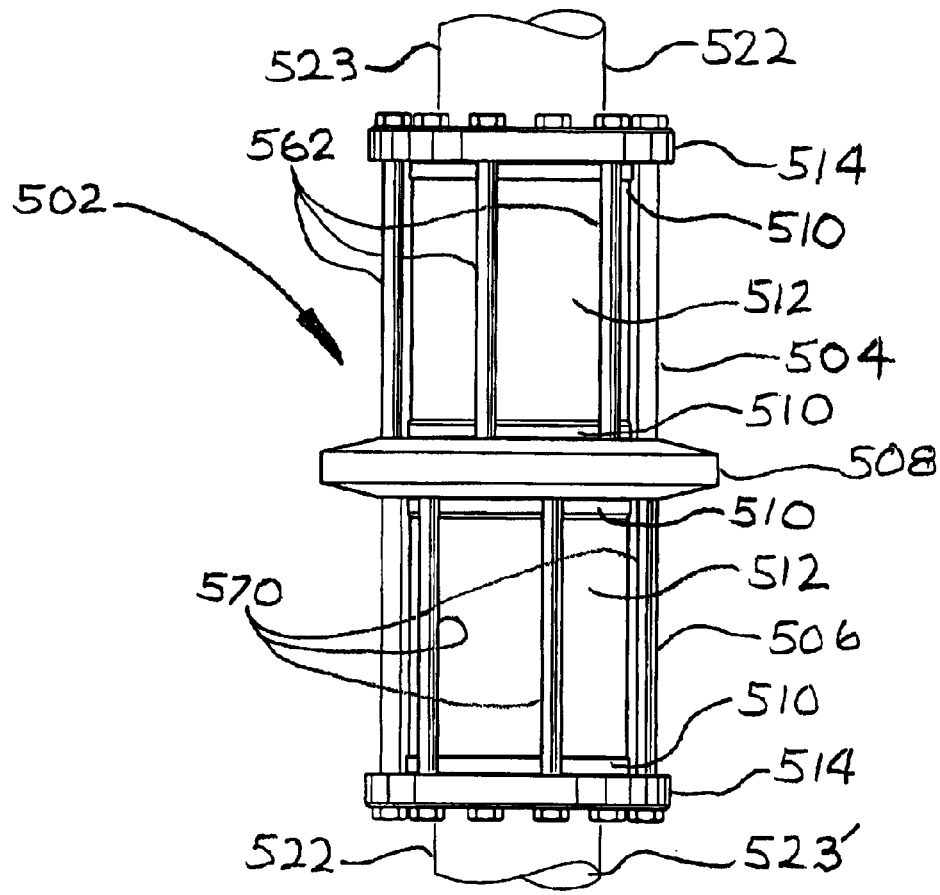
FIG. 26 is a perspective view of a compression coupler according to a preferred embodiment of the present invention.
Figure 27:
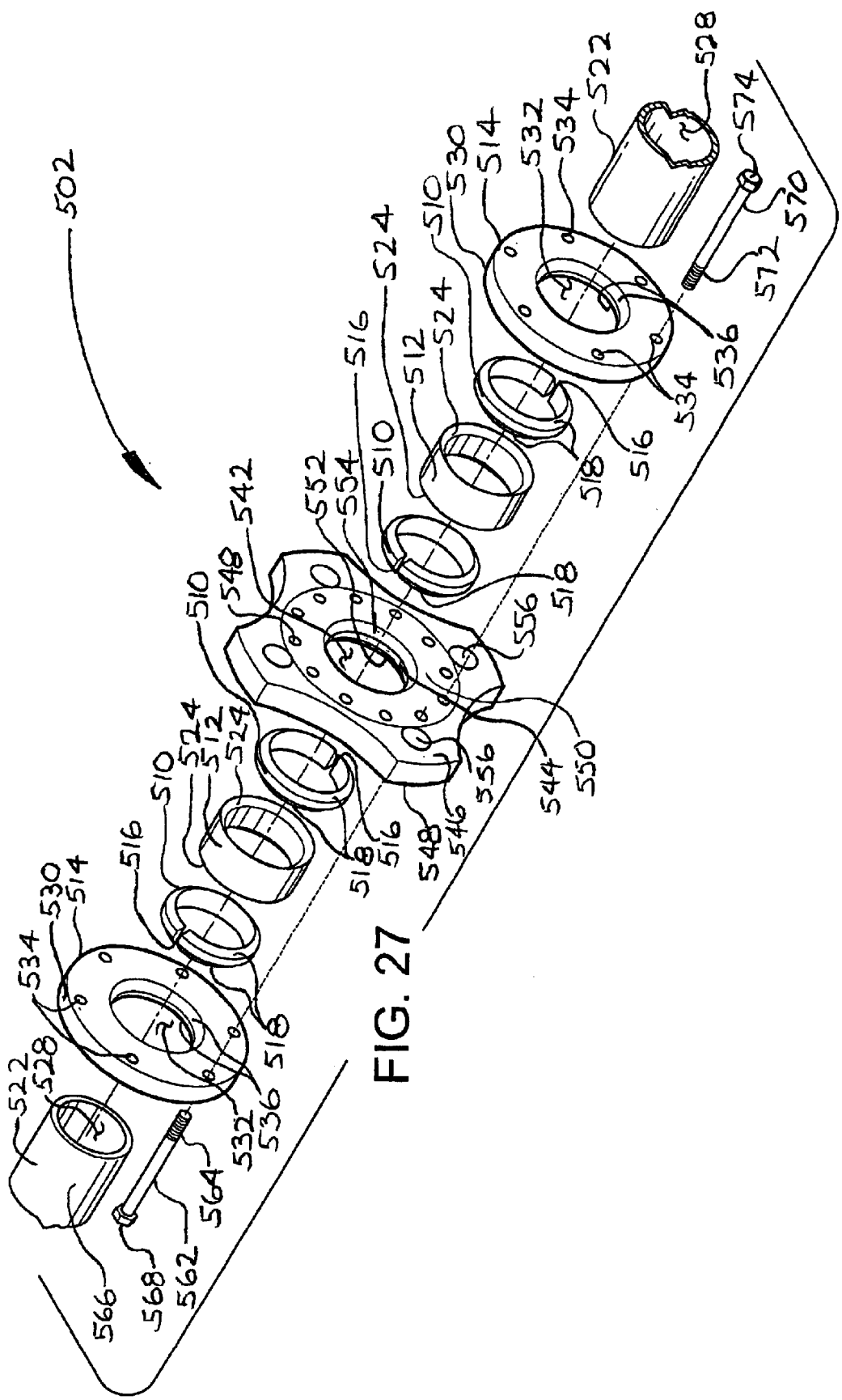
FIG. 27 is an exploded perspective view of the compression coupler of FIG. 26.
Figure 28:
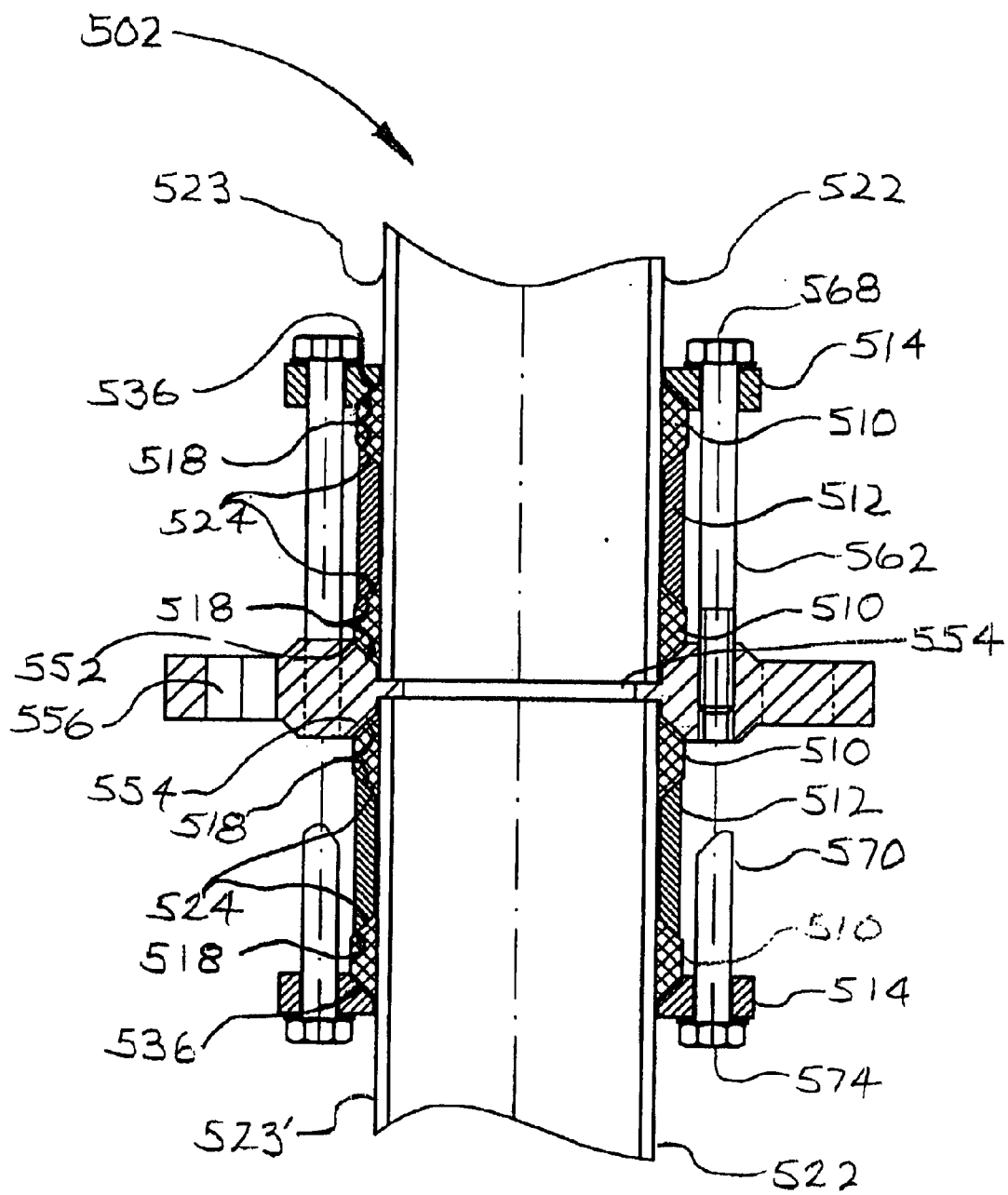
FIG. 28 is a sectional view through the section 28—28 of FIG. 25.

Reference is now made to the following Figures: FIG. 25, FIG. 26, FIG. 27 and FIG. 28. FIG. 25 is a top view of a compression coupler 502 according to a preferred embodiment of the present invention. FIG. 26 is a perspective view of a compression coupler 502 according to a preferred embodiment of the present invention. FIG. 27 is an exploded perspective view of the compression coupler 502 of FIG. 26. FIG. 28 is a section view through section 28—28 of FIG. 25. Preferably, the compression coupler 502 comprises an upper portion 504, a lower portion 506, and a middle portion 508. Most preferably, the compression coupler 502 is metal, preferably stainless steel, preferably type 304 stainless steel. However, under appropriate circumstances, other materials and arrangements may suffice. For example, the compression coupler 502 is preferably stainless steel to provide both strength and corrosion resistance. Furthermore, such material is easily machined and available; however, other materials that would provide such functions may also suffice without detracting from the described embodiment of the invention. In light of the teaching herein described, those knowledgeable in such material art may choose to select such other materials.

Preferably, each upper portion 504 and each lower portion 506 comprise two compression rings 510, a distancing sleeve 512, and an end-cap 514, as shown. Preferably, the compression coupler 502 is symmetrical, as shown. Preferably, each compression ring 510 comprises a vertical split 516 and two outer beveled ends 518, one on each end of the compression ring 510, as shown. Preferably, each beveled end 518 comprises an outer bevel 520 of 45-degrees. Under appropriate circumstances, other degrees of bevel may suffice. Furthermore, under appropriate circumstances, other compression ring arrangements may suffice. For example, more than one vertical split 516 in each compression ring 510 could be used, although not preferred. Preferably, the compression ring 510 is sized such that when not compressed, the outer diameter of a selected-sized pipe 522 (the preferred material for building a tower mast) may be inserted within the compression ring 510 and when compressed (as will be further detailed) the inner diameter of the compression ring 510 would be smaller than the outer diameter of a selected-sized pipe 522. In such manner, compression of the compression rings 510 provides an extremely good clamp for holding the pipe 522.

Preferably, each distancing sleeve 512 comprises a cylinder, preferably slightly larger than the selected-sized pipe 522, as shown. Preferably, each end of the distancing sleeve 512 comprises an inside beveled end 524, preferably a 45-degree inside bevel, as shown, preferably arranged to abut an adjacent 45-degree outer bevel. Under appropriate circumstances, other bevel angles or arrangements may suffice. Preferably, the distancing sleeve 512 is about 27 mm in length. Under appropriate circumstances, other arrangements may suffice. For example, the length of the distancing sleeve 512 may vary depending on the user's preference and the use conditions (taking into account potential wind shear or other forces the pipe may be exposed too and the area of pipe 522 desired to be encased by the coupler 502). Preferably, a compression coupler 502 coupling two twenty-one to twenty-four foot lengths of two-inch diameter pipe utilizes about a 27 mm sized sleeve.

Preferably, each end-cap 514 comprises an annular flange 530, preferably unitary in structure, as shown. Preferably, each end-cap 514 comprises a central opening 532 sized to slide over a selected-sized pipe 522, as shown. Preferably, each annular flange 530 further comprises a set of bolt-apertures 534, preferably six bolt-apertures, preferably offset about 60 degrees each, as shown. Under appropriate circumstances, other arrangements may suffice. For example, the diameter of the annular flange 530 and the stresses upon which the compression coupler 502 may be placed may affect the number of bolt-apertures 534 and the diameter of the bolt-apertures 534 (if larger diameter bolts are utilized). Applicant has determined that, for the described embodiment, coupling a two to three-inch diameter pipe in lengths of twenty-one to twenty-four feet, six equally spaced bolt-apertures 534 of about 6 mm in diameter are sufficient. In light of the teaching herein, and under appropriate circumstances, those knowledgeable in such art may determine other such diameters and attachments that may suffice.

Preferably, each annular flange 530 further comprises an inner beveled edge 536, preferably a 45-degree bevel, (preferably on each side, however particularly on the inside portion facing the middle portion 508), preferably arranged to abut an adjacent 45-degree outer bevel, as shown. Preferably, the beveled edge 536 is on the interior 538 of the central opening 532 such that the beveled edge 536 abuts the distancing sleeve 512 when the compression coupler 502 is assembled and in use, as shown.

Preferably, the middle portion 508 comprises a unitary flange 540, preferably annular, further comprising a central opening 542, preferably comprising a blocker 544 on each side (hereafter referred to as stop 544). Preferably, the stop 544 comprises a diameter slightly smaller than the selected-sized pipe 522 such that the selected-sized pipe 522 may only be inserted into the compression coupler 502 up to the stop 544, but leaving the pipe center opening 528 such that power wires etc. may be installed along the interior of the pipe 522. Preferably, each end 546 and 548 of the unitary flange 540 comprises a stop 544. Most preferably, the stop 544 is circular such that the stop 544 touches equally around the perimeter end 546 of an inserted selected-sized pipe 522, as shown. Preferably, the unitary flange 540 further comprises a plurality of bolt-apertures 548, preferably equally spaced around an exterior portion 550 of the unitary flange 540, as shown. Preferably, the unitary flange 540 comprises twelve such bolt-apertures 548, about 30 degrees apart, as shown. Preferably, each aperture extends through the unitary flange 540. Preferably, each aperture is threaded such that a bolt may be threaded into the unitary flange 540. Under appropriate circumstances, other arrangements may suffice.

Additionally, the unitary flange 540 comprises an upper inner bevel 552 and a lower inner bevel 554, as shown. Preferably, each respective upper bevel 552 and lower bevel 554 are positioned such that they will abut a respective outer beveled end 518 of a respective compression ring 510 when in operation, as shown. In light of the teachings herein, and under appropriate circumstances, other beveling arrangements (or compressive arrangements) may suffice.

Preferably, the unitary flange 540 comprises apertures 556 for use to attach guy lines 560 (herein referred to as guy wires 560). Most preferably, the unitary flange 540 comprises four such apertures 556, preferably equally spaced and offset from the apertures 556, as shown. In light of the teachings herein, those knowledgeable in such art may choose other arrangements that, under appropriate circumstances, may suffice. For example, certain high wind loads or weight distributions may require engineering that recommends more or fewer apertures for more or fewer guy wires. In addition, guy wire cable sizes and attachments may change as technology changes enabling larger or smaller apertures.

One of the preferred features of the guy wire apertures 556 is that the apertures 556 are unitarily part of the unitary flange 540. This embodiment greatly reduces failure of the flange to hold a guy wire 560 (one of the problems with the prior art).

Preferably, in operation, a compression coupler 502 adjoins two selected-sized pipe portions 523 and 523'. Preferably, one pipe end 566 of a selected-sized pipe 523 is installed into an upper portion 504 of the compression coupler 502. Preferably, an end-cap 514 is placed over the pipe end 566 followed by a compression ring 510, a distancing sleeve 512, another compression ring 510 and the middle portion 508. In some instances, a rubber mallet may be required to tap on the compression rings 510 or a tool (such as a screwdriver) utilized to spread the vertical split 516 wide enough to fit over the pipe 523. Preferably, the vertical splits 516 are aligned opposite each other (one-hundred-eighty degrees apart). Most preferably the unitary flange 540 is adjusted such that the guy wire apertures are placed where desired prior to assembly of the compressive coupler 502. Next, preferably, a first set of bolts 562, each bolt comprising threaded end portions 564 and a unitary head 568, preferably a hex head, are inserted through every bolt-aperture 534 in a respective end-cap 514 and then threaded into every other aligned bolt-aperture 548 in the unitary flange 540 (most preferably, these bolt apertures 514 and 548 are designed and built to be aligned as such). Preferably, the bolts 562, acting as a compression attachment adapted to compression-attach the coupling system to the elongated member (pole) of the tower support system, are tightened in a symmetrical manner such that as the end-cap 514 is drawn towards the unitary flange 540 (which has pipe stop 544 such that the unitary flange will not be pulled) a compressive force will be placed along each abutting bevel (inner bevel 536 to outer bevels 518 to outer bevels 524 to outer bevels 518 to inner bevel 552) such that the compression rings 510 (acting as a force distributer adapted to distribute at least one compressive force substantially evenly around at least one perimeter of the at least one first elongated member) will be compressed and drawn tightly around the pipe 523, as described herein.

Preferably, the lower portion 506 is installed in a similar manner. Preferably, an end-cap 514 is placed over the pipe end 570 followed by a compression ring 510, a distancing sleeve 512, another compression ring 510 and the middle portion 508. Again, a rubber mallet may be required to tap on the compression rings 510 or a screwdriver utilized to spread the vertical split 516 wide enough to fit over the pipe 523'. Preferably, the vertical splits 516 are aligned opposite each other. Preferably, a second set of bolts 570, each bolt comprising threaded end portions 572 and a unitary head 574, preferably a hex head, are inserted through the bolt-apertures 534 in the other respective end-cap 514 and then in every other bolt aperture 548 in the unitary flange 540 (that is not being used by the first set of bolts 562) and threadably inserted, as shown.

Preferably, the bolts 570 are tightened in a symmetrical manner such that the end-cap 514 is drawn towards the unitary flange 540 causing a compressive force to be placed along each abutting bevel (bevel 536 to bevels 518 to bevel 524 to bevels 518 to bevel 554) such that the compression rings 510 will be compressed and drawn tightly around the pipe 523', as shown.

In such manner, the compressive coupler 502 adjoins two portions of pipe and provides a means to attach guy wires 560 for stabilizing the Mast.

Figure 29:
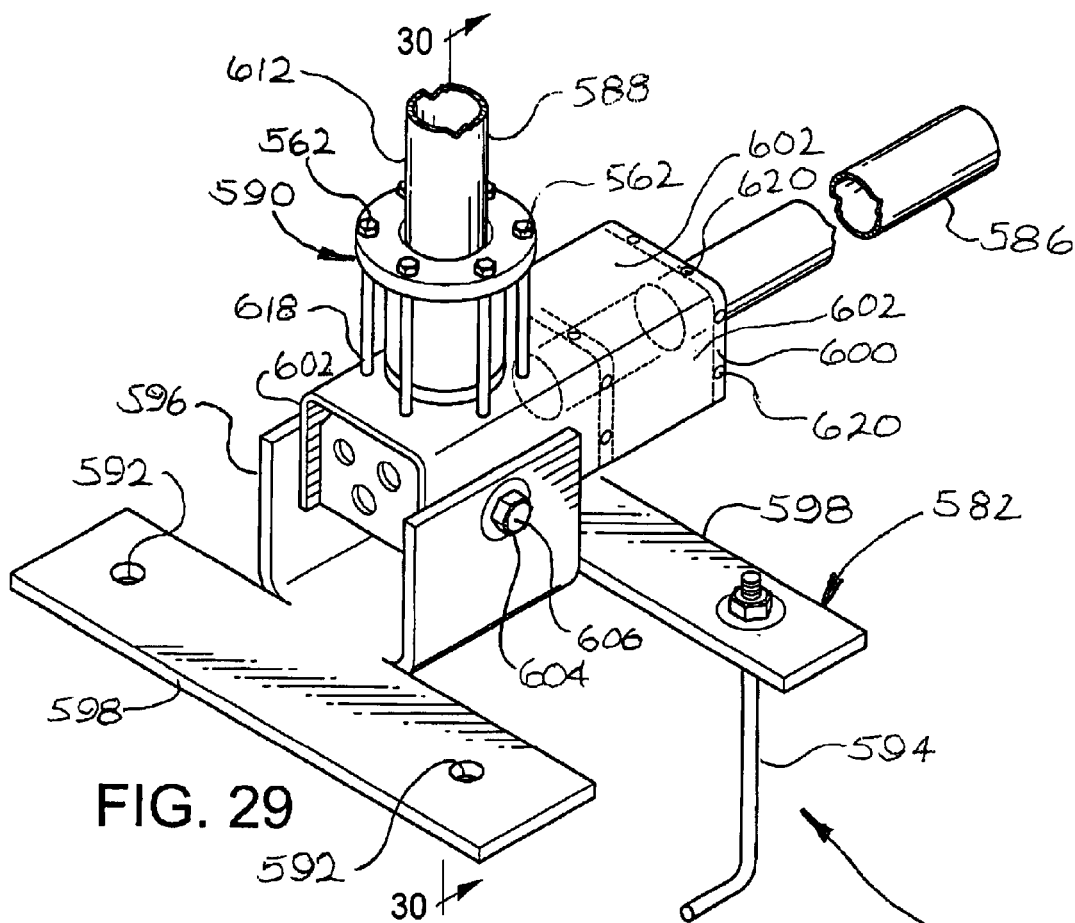
FIG. 29 is a perspective view of a tower base assembly according to a preferred embodiment of the present invention.
Figure 30:
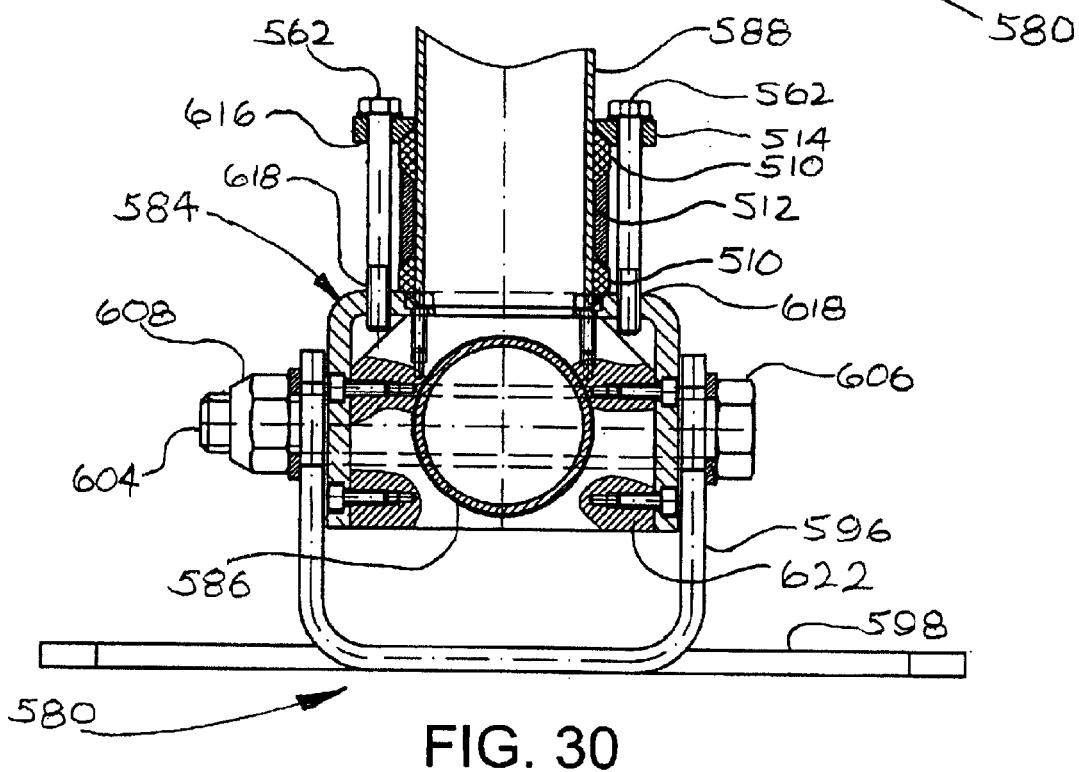
FIG. 30 is a sectional view through section 30—30 of FIG. 29.

Reference is now made to FIG. 29 and FIG. 30 with continued reference to FIGS. 25 through FIG. 28. FIG. 29 is a perspective view of a tower base assembly 580 according to a preferred embodiment of the present invention. FIG. 30 is a sectional view through section 30—30 of FIG. 29.

Preferably, the tower base assembly 580 comprises a base plate 582, a swivel assembly 584, a removable lever 586 (for raising the mast 588) and a base-mast coupling assembly 590, as shown.

Preferably, the base plate 582 is comprised of a 6.35 mm thick steel plate, (about one-quarter-inch thick) preferably stainless steel, preferably type 304 stainless steel, as shown. Preferably, the base plate 582 comprises apertures 592 for attaching anchors 594 to the base plate 582 for anchoring the base plate 582, preferably in a concrete slab. The size of the concrete slab is generally dependent on the size of the mast and other engineering considerations. In light of the teachings herein such engineering may easily be accomplished by those knowledgeable in such art without undue experimentation. Preferably, the base plate 582 further comprises a U-shaped portion 596 and two flat-plate portions 598, as shown. Preferably, the base plate is about 258 mm in length.

Preferably, each flat-plate portions 598 is about 75.8 mm in width. Preferably, U-shaped portion 596 is about 80 mm in width. Under appropriate circumstances, other dimensions may suffice.

Preferably, the swivel assembly 584 comprises a U-shaped plate 600, most preferably having three substantially flat sides 602, as shown in FIG. 30. It is noted that a cylinder may also be used, preferably a square cylinder as shown in FIG. 29. Preferably, the swivel assembly 584 is comprised of steel, preferably stainless steel, preferably type 304 stainless steel. It is noted that the preferred material is stainless steel, however, under appropriate circumstances, other materials and arrangements may suffice. For example, stainless steel provides both strength and corrosion resistance. Furthermore, such material is easily machined and available, however, other materials that would provide such functions may also suffice without detracting from the described embodiment of the invention. In light of the teaching herein described, those knowledgeable in such material art may choose to select such other materials.

Preferably, swivel assembly 584 swivels or pivots on a central axle 604, as shown. Preferably, the central axle 604 comprises a bolt 606 and nut 608, preferably stainless steel, preferably type 304 stainless steel. Preferably, bolt 606 comprises a bolt about 19 mm in diameter. Under appropriate circumstances, other arrangements may suffice.

Preferably, the base-mast coupling assembly 590 comprises only an upper portion 504 of a compression coupler 502 (as described above with slight modification as now described) further comprising two compression rings 510, a distancing sleeve 512, and an end-cap 514, as shown. Preferably, one mast end 610 of a selected-sized pipe 612 is placed into the base-mast coupling assembly 590, as shown. Preferably, the base-mast coupling assembly 590 comprises a compression ring 510, a distancing sleeve 512, another compression ring 510 and an end-cap 514, as shown. Preferably, bolts 562 are placed in every aperture 616 in the end-cap 514 and threaded into threaded apertures 618 on the support plate 614 on the swivel assembly 584. Preferably, bolts 562 are tightened in a symmetrical manner such that as the end-cap 514 is drawn towards the support plate 614 on the swivel assembly 584. Preferably, a compressive force will be placed along each abutting bevel as previously described such that the compression rings 510 will be compressed and drawn tightly around the mast end 610.

Preferably, a removable lever 586 is utilized for assisting in the assembly of the apparatus on the ground and then lifting it into place. Preferably, the swivel assembly 584 comprises a set of bolt apertures 620 that are used to attach an insert 622 into the interior of the swivel assembly 584 for inserting the removable lever 586. Preferably, the removable lever is placed with the insert 622 and used to lift the entire unit. In light of the teachings herein, those knowledgeable in such lever art may choose, under appropriate circumstances to utilize other methods which may suffice.

APPENDIX A

TURBINE

| Supplier's name | Part's Name | Name of the material | Remarks |
|---|---|---|---|
| Qingdao Zhengda casting Co. LTD | Face Plate, Bell Housing, Back cap, Yaw body, Yaw shaft | Al 356-T6 | |
| Qingdao Fu Tian Environmental protection and electric power Co. LTD | Hub Plate | 304 Stainless Steel | |
| | Yaw shaft Clamp | 304 stainless Steel | |
| | Slip Ring | Brass | |
| | Slipring Brush | Copper | |
| | Tail Fin | Al 6061-76 | |
| | Support Brace | Al 6061-76 | |
| | Cross Brace | Al 6061-76 | |
| | Tail Boom | Stainless Steel | |
| | Nipple adapter | Al 6061-76 | |
| | Control cover | Organic Glass | |
| | Control Chase | Aluminium | |
| | Partial Tower Kits | Stainless Steel | |
| | Coupler | Stainless Steel | |
| | Linking Parts | Stainless Steel | |
| Qingdao QiLe Plastic Co. LTD | Isolator Ring | Natural Nylon96 | |
| Yongming hardware store | Cable | 8#, 12# | |
| Hualong Standard Parts | Standard Parts | Stainless Steel | |
| Qingdao Magnetic Co. | Magnet | Neodynium Iron Boror | |
| NingBo Tri-Star Spring Parts Co. | Constant Force Torsional Spring | Spring Steel | |
| JinLita forging machine CO. | Furling spring | Spring Steel | |
| SKF | Bearing | SKF | Iron and double seal |

BLADE

| Name of Parts | Material of the part | Supplier's name | Remarks |
|---|---|---|---|
| Blade handle | Polyurethane | Qingdao Yongde Polyurethane Co. | |
| | Glass Fibre | Nanjing Filter filter material Study and Development Centre | Diameter 5-7 um |
| Blade Paint | White Special Car Paint for White Blade | Yinfan Chemical Co. LTD | |
| | Polyurethane Paint for Black Blade | | Carbon Black |
| Nose Cone | Polycarbonate | General Motor US | |
| Brush Holder | Polycarbonate | General Motor US | |
| Foam Core | Low-density Polyurethane | Qingdao Yongde Polyurethane Co. | |
| Cutting Kits | Unidirectional Pre-preg carbon fiber | Korean SK Co. | |
| Appliance | Carbon Black | Germany Carbon Black Co. | |
| | Reichhold B27 Resin | JiangXi Yuanda chemical Co. | |
| Release Wax | American Tri-star Wax 108 | | |
| Release Film | Release Film Dissolved in Water | Qingdao Chemical Research Institute | |

Although applicant has described applicant's preferred embodiments of this invention, it will be understood that the broadest scope of this invention includes such modifications as diverse shapes and sizes and materials. Such scope is limited only by the below claim as read in connection with the above specification.

Further, many other advantages of applicant's invention will be apparent to those skilled in the art from the above descriptions and the below claims.

Although applicant has described applicant's preferred embodiments of this invention, it will be understood that the broadest scope of this invention includes such modifications as diverse shapes and sizes and materials. Such scope is limited only by the below claim as read in connection with the above specification.

Further, many other advantages of applicant's invention will be apparent to those skilled in the art from the above descriptions and the below claims.

What is claimed is:

1. A wind-driven system, for producing electric current, comprising, in combination:
   a) at least one frame adapted to swivel about a substantially vertical axis, comprising
      i) at least one front-portion adapted to extend forwardly into a wind-flow direction and
      ii) at least one rear-portion adapted to extend rearwardly downwind from said at least one front portion;
   b) at least one guide-vane connected to said at least one frame and adapted to guide said at least one frame with respect to the wind-flow direction;
   c) at least one magnetic-field producer, comprising at least one rotor adapted to rotate about at least one rotational axis;
   d) at least one alternator, connected to said at least one frame, adapted to produce electric current, comprising at least one rotor shaft adapted to support said rotor for rotation of said at least one magnetic-field producer;
   e) wherein said at least one magnetic-field producer and said at least one alternator together comprise at least one electric current generator; and
   f) at least one airfoil blade, mounted to at least one end of said at least one rotor, adapted to drive said at least one rotor; and
   g) at least one nose-cone, extending forwardly from said at least one front-portion, adapted to modify air-flow through said wind-driven means;
   h) wherein said at least one airfoil blade comprises at least one longitudinal axis and at least one skin and at least one interior;
   i) wherein said at least one skin substantially comprises axial reinforcers adapted to reinforce said at least one skin substantially unidirectionally substantially parallel to the at least one longitudinal axis;
   j) wherein said at least one interior comprises at least one foam element comprising at least one material associated with enabling substantial outward pressure on said at least one skin during curing of said at least one foam element.

2. The system of claim 1 wherein:
   a) said at least one airfoil blade comprises at least one longitudinal axis and at least one skin;
   b) said at least one interior comprises at least one outward interior and at least one inward interior; and
   c) said at least one inward interior comprises vermiculite.

3. The system according to claim 1, further comprising:
   a) at least one supporting tower for said at least one frame;
   b) wherein said at least one supporting tower comprises
      i) at least one first length of support pipe
      ii) at least one second length of support pipe
      iii) at least one guy wire for ground attachment for lateral support for said at least one tower, and
      iv) at least one connector adapted both to
         1. firmly connect an upper end of said at least one first length of support pipe to a lower end of said at least one second length of support pipe, and
         2. firmly connect said at least one guy wire to said at least one connector.

4. The system according to claim 1 wherein said at least one skin substantially comprises
   i) multiple layers of axial reinforcers adapted to reinforce said at least one skin substantially unidirectionally substantially parallel to the at least one longitudinal axis, and
   ii) one layer of transverse reinforcers adapted to reinforce said at least one skin substantially unidirectionally substantially perpendicular to the at least one longitudinal axis.

* * * * *